(12) United States Patent
Almaraz et al.

(10) Patent No.: US 11,301,485 B2
(45) Date of Patent: Apr. 12, 2022

(54) OFFLOADING DATA TO A COLD STORAGE DATABASE

(71) Applicant: salesforce.com, inc., San Francisco, CA (US)

(72) Inventors: Martin Mario Almaraz, San Francisco, CA (US); Valliappan Annamalai Natarajan, San Ramon, CA (US); Jan Asita Fernando, San Francisco, CA (US); Matthew Davidchuk, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 241 days.

(21) Appl. No.: 16/564,516

(22) Filed: Sep. 9, 2019

(65) Prior Publication Data

US 2021/0073240 A1 Mar. 11, 2021

(51) Int. Cl.
*G06F 16/25* (2019.01)
*G06F 16/21* (2019.01)
*G06F 16/27* (2019.01)

(52) U.S. Cl.
CPC .......... *G06F 16/258* (2019.01); *G06F 16/214* (2019.01); *G06F 16/273* (2019.01)

(58) Field of Classification Search
CPC ..... G06F 16/258; G06F 16/273; G06F 16/214
USPC ................................................. 707/667–673
See application file for complete search history.

(56) References Cited

U.S. PATENT DOCUMENTS

| | | | | |
|---|---|---|---|---|
| 7,467,267 B1* | 12/2008 | Mayock | ............. | G06F 11/1464 711/162 |
| 8,626,714 B1* | 1/2014 | Gibson | ................ | G06F 16/285 707/640 |
| 9,235,582 B1* | 1/2016 | Madiraju Varadaraju | | ................... G06F 11/1451 |
| 10,956,408 B2* | 3/2021 | Iruku | ..................... | G06F 16/258 |
| 2005/0149584 A1* | 7/2005 | Bourbonnais | .......... | G06F 16/256 |
| 2005/0160312 A1* | 7/2005 | Seng | .................. | G06F 11/2097 714/13 |
| 2016/0041882 A1* | 2/2016 | Kruse | ................. | G06F 11/1438 714/16 |
| 2018/0060176 A1* | 3/2018 | Thakkar | ............. | G06F 9/45558 |
| 2018/0203604 A1* | 7/2018 | Bahl | ................... | H04L 67/2823 |
| 2018/0322138 A1* | 11/2018 | Chang | ................. | G06F 16/1727 |
| 2019/0332692 A1* | 10/2019 | Rachapudi | .......... | G06F 11/1471 |

* cited by examiner

*Primary Examiner* — Hares Jami
(74) *Attorney, Agent, or Firm* — Holland & Hart LLP

(57) ABSTRACT

Methods, systems, and devices supporting data archiving are described. A device (e.g., an application server) may identify a set of archiving jobs for a first database (e.g., a relational database), where each archiving job indicates a set of data records for archiving. The device may receive a data record of the set of data records from the first database, where the data record is filtered by an abstraction layer (e.g., removing some information from the data record such that the filtered data record corresponds to a user's view of the data record). For example, the filtered data record may include a subset of the total information for the stored data record. The device may transform this received, filtered data record from a first format to a second format supported by a second database. The device may then send the transformed data record to the second database for storage.

17 Claims, 13 Drawing Sheets

OFFLOADING DATA TO A COLD STORAGE DATABASE

FIELD OF TECHNOLOGY

The present disclosure relates generally to database systems and data processing, and more specifically to offloading data to a cold storage database.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Database systems (e.g., database systems handling CRM data) may store large quantities of data. Data in such database systems may be archived from a first database to a second database. Current techniques for archiving data in a database system may pose multiple challenges, such as moving data across databases of different ideologies, maintaining communications between separate databases, and handling user interactions with the data records during the archiving process.

DETAILED DESCRIPTION

Figure 1:
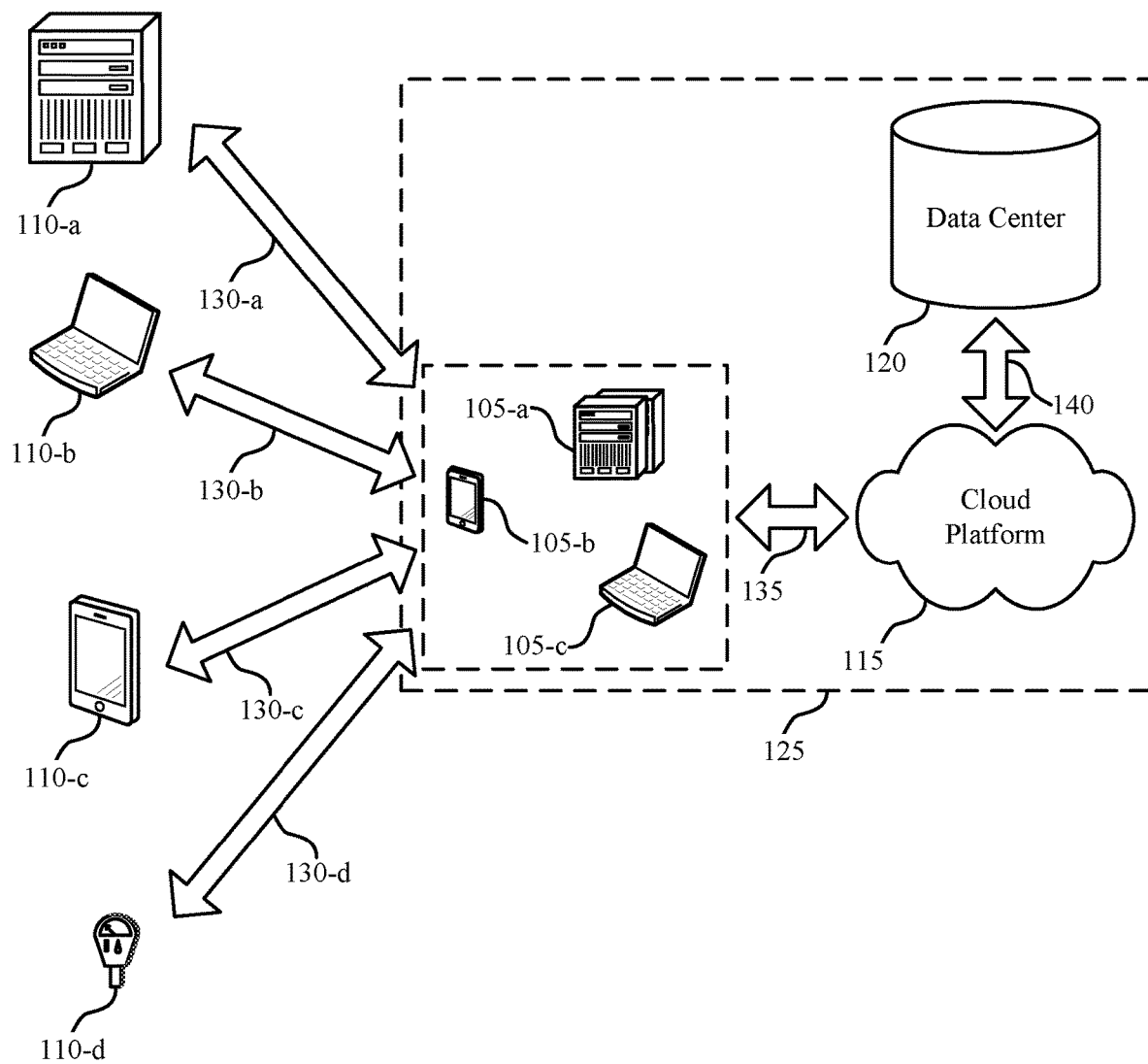
FIG. 1 illustrates an example of a system for data archiving that supports offloading data to a cold storage database in accordance with aspects of the present disclosure.

Some cloud platforms may use a database system containing multiple data stores to store data records (e.g., data records containing customer relationship management (CRM) information, among other types of data). Some database systems may store a large quantity of data in a primary database configured for low-latency data access, leading to performance and/or resource issues. In particular multi-tenant environments, maintaining large amounts of data generated by each tenant may be a resource intensive process. For example, in a multi-tenant environment, each tenant may generate large amounts of data each day, which may lead to database performance issues. Specifically, due to the nature of the multi-tenant system, some tenants with high volumes of data can cause database performance issues when storing the data. Additionally or alternatively, the tenants with such high volumes of data may have restrictions on the amount of historical data that can be stored in the primary database. In some cases, tenants storing high volumes of data may be subjected to high costs for maintaining storage of that data. The database systems may implement archiving processes to move data records from one data store to another data store. Archiving data in a live database system may involve moving data records across databases of different ideologies, maintaining communications between separate databases, and ensuring data record consistency throughout the archiving process. Specifically, the process of archiving data may include offloading data from a primary database to a secondary database. As the primary database and secondary database serve different functions, moving data between databases of different types (such as, between a relational database and a non-relational database) may present a number of challenges, including dropping database connections and losing data.

A data storage system may implement an offloading process for archiving data from a first database (e.g., a primary database configured or optimized for low-latency querying) to a second database (e.g., a secondary database configured or optimized for long-term data storage, which may be referred to as a cold storage database). The primary database and the secondary database may be different types of databases that do not support equal functionalities such as transactions, rollbacks, constant availability, etc. The offloading process described herein can improve the efficiency when archiving data records while maintaining communication between the two separate databases. For example, a set of data may be selected for archiving from a first database (e.g., a relational database management system (RDBMS) configured or optimized for executing efficient querying) to a second database (e.g., a non-relational database configured or optimized for long-term storage). An application server may receive a set of jobs (e.g., archiving jobs) from an asynchronous background queue (such as a cron job). For example, the set of jobs may include the data records to be archived to a secondary database. The application server may use a database connection with the primary database to receive the set of jobs or an indication of the set of jobs for the archiving process.

Upon receiving the set of jobs from the background queue, the application server may identify the data records to be archived in multiple batches. For instance, the application server may identify a set of data records in the primary database based on at least a first batch of the set of jobs. The set of data records may be stored in a first format supported by the primary database. In some cases, a stored data record of the set of data records may include a set of information (such as a first set of fields visible to a tenant and a second set of fields hidden from the tenant). The application server may copy the set of data records included in the first batch from the primary database. Copying the data records may involve retrieving the data records from the primary database via an abstraction layer, where the abstraction layer effectively filters the data records such that the received data records contain a subset of the total information stored for the data records in the primary database. For example, the filtered data records may include the information for the data records that would be visible to a tenant or client, but may not include any hidden fields for these data records. In some cases, the data records may be batched according to a relationship between the data records (e.g., children of the same parent data record may be grouped in a single batch).

Upon retrieving the filtered data records, the application server may transform the filtered data records from a first format to a second format different from the first format and supported by the secondary database. That is, the application server may transform the filtered data records from a format supported by the primary database (e.g., rows of data from database tables) into a format supported by the secondary database (e.g., key-value pairs). The application server may then write the transformed data records to the secondary database. In some systems, the application server may write the transformed data records to the secondary database via a second abstraction layer. During the archiving process, the application server may lock a portion of the primary database to prevent data inconsistencies. Thus, the present disclosure efficiently archives data while handling many unknown and non-deterministic failures such as network outages, database malfunctions, secondary database compactions, and network timeouts. Additionally or alternatively, the offloading of the data described herein may be automatically performed during off-hours, without any adverse effect on a tenant's day-to-day operations (e.g., based on the asynchronous background queue).

Aspects of the disclosure are initially described in the context of an environment supporting an on-demand database service. Aspects of the disclosure are further described with respect to an archiving system, archiving processes, and a process flow diagram. Aspects of the disclosure are further illustrated by and described with reference to apparatus diagrams, system diagrams, and flowcharts that relate to offloading data to a cold storage database.

FIG. 1 illustrates an example of a system 100 for data archiving that supports offloading data to a cold storage database in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may be an example of a database system including multiple interconnected databases, data stores, or any other types of data storage systems. For example, the data center 120 may include a primary database and a secondary database. The database system may store a large quantity of data in the primary database configured for low-latency data access. In some cases, a portion of the data stored in the primary database may not be accessed by clients on a regular basis. To support efficient storage and distribution of the data between the databases, the primary database and the secondary database may support a data archiving process. In some examples, the primary database may include an RDBMS and the secondary database may include a non-relational database. The cloud platform 115 or an application server of subsystem 125 may handle data archiving between the databases (such as the primary database and the secondary database). For instance, the cloud platform 115 or an application server of subsystem 125 may copy data from the primary database and write the data to the secondary database (e.g., performing a data-value copy from the primary database to an archive record in the secondary database). Upon successful completion of archiving a data record, the cloud platform 115 or an application server of subsystem 125 may delete the data record from the primary database (e.g., after the data is successfully archived at the secondary database). In some cases, a cloud client 105 or contact 110 may archive a data record from the primary database to the secondary database using the methods described herein. Archiving data from an RDBMS to a non-relational database may support maintaining communication between separate, ideologically different databases throughout the archiving process in a multi-tenant database environment.

In some other database management systems, storing large amounts of data at a primary database may lead to performance and/or resource issues. Additionally, in multi-tenant environments, the data generated by multiple tenants may result in large amounts of data and storing the data may be a resource intensive process. In some multi-tenant systems, some tenants may store more data than other tenants. For example, a first tenant may be a client of the multi-tenant system for a longer period of time and may have generated a large amount of historical data. In such cases, tenants having high volumes of data may be subjected to high costs for storage of the data. In some cases, each tenant may generate large amounts of data each day, which may lead to database performance issues. In some database systems, an archiving process may move data records from one data store to another data store. Archiving data in a live database system may pose challenges as the live database system may be located in an environment including multiple tenants simultaneously accessing the database system. Also, as the primary database and secondary database serve different functions, moving data between databases of different types (such as, between a relational database and a non-relational database) may present a number of challenges, including dropping database connections or losing portions of the data. Additionally or alternatively, live database systems may suffer from network outages posing a challenge to the archiving process. Thus, a robust process for archiving data may be needed to effectively archive data between a primary database and a secondary database in a live database system.

According to one or more aspects of the present disclosure, the system 100 may provide one or more techniques for archiving data that improves the efficiency of the archiving process between a primary database and a secondary database. This archiving process may be robust against dropping database connections and losing data. For example, an application server of subsystem 125 may perform a method for offloading data from a primary database to a secondary database. In some examples, the system 100 may improve the efficiency of archiving data records while maintaining communication between two separate databases of different types. As described herein, the two databases may not support equal functionalities such as transactions, rollbacks, constant availability, etc. In some examples, the application server of subsystem 125 may select a set of data for archiving from a first database (e.g., an RDBMS for efficient querying) to a second database (e.g., a non-relational database for cold storage). The application server may utilize a background job queue to select the set of data. The set of jobs may include the data records to be archived to the non-relational database for long-term storage. In some examples, the application server may identify the data records to be archived in multiple batches, where the server performs the batching process according to a tenant associated with the data records. In some cases, the application server may copy a set of data records included in a batch via an abstraction layer and a database connection. Copying the data records via the abstraction layer may provide for copying information for the data records that would be visible to a tenant or client and not copying any hidden fields.

The application server may transform the copied data records prior to archiving the data records to the secondary database. For instance, the application server may transform the filtered data records from a first format (such as a tabular format, where each data record is represented as a row of data) to a second format (such as a key-value format, where each data record is represented as a key-value pair) different from the first format and supported by the secondary database (e.g., an HBase database). Upon successful transformation, the application server may write the transformed data records to the secondary database via a second abstraction layer. If the transformed data records are successfully written to the secondary database, the application server may delete these data records from the primary database and may grant users access to the transformed data records in the secondary database. Thus, the system 100 efficiently archives data between the different types of databases and may additionally handle many unknown and non-deterministic failures such as network outages, database malfunctions, secondary database compactions, and network timeouts. The system 100 may maintain access to the data records through a platform of the multi-tenant system (e.g., supporting access at the secondary database once the archiving process is complete) while saving on resources of the primary database system.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing and cloud platforms may store large amounts of data in a database system. For example, a multi-tenant database system may store data records for multiple tenants. Some of the data may be rarely accessed, but storage may be governed by policy, law, etc. An application allowing a user to access (e.g., view, analyze, modify, delete, etc.) the stored data may run on a primary data store. An archiving process may move data (e.g., based on which data records have been least recently accessed, least recently updated, least frequently accessed, etc.) from the primary data store to a secondary data store. This can decrease the size of the primary data store (e.g., freeing up resources for new data storage) and increase the efficiency of operations performed in the primary database. Additionally, the data removed from the primary data store may still be accessible (e.g., for querying purposes, auditing purposes, regulatory purposes, etc.) as historical data in cold storage of the secondary datastore.

Figure 2:
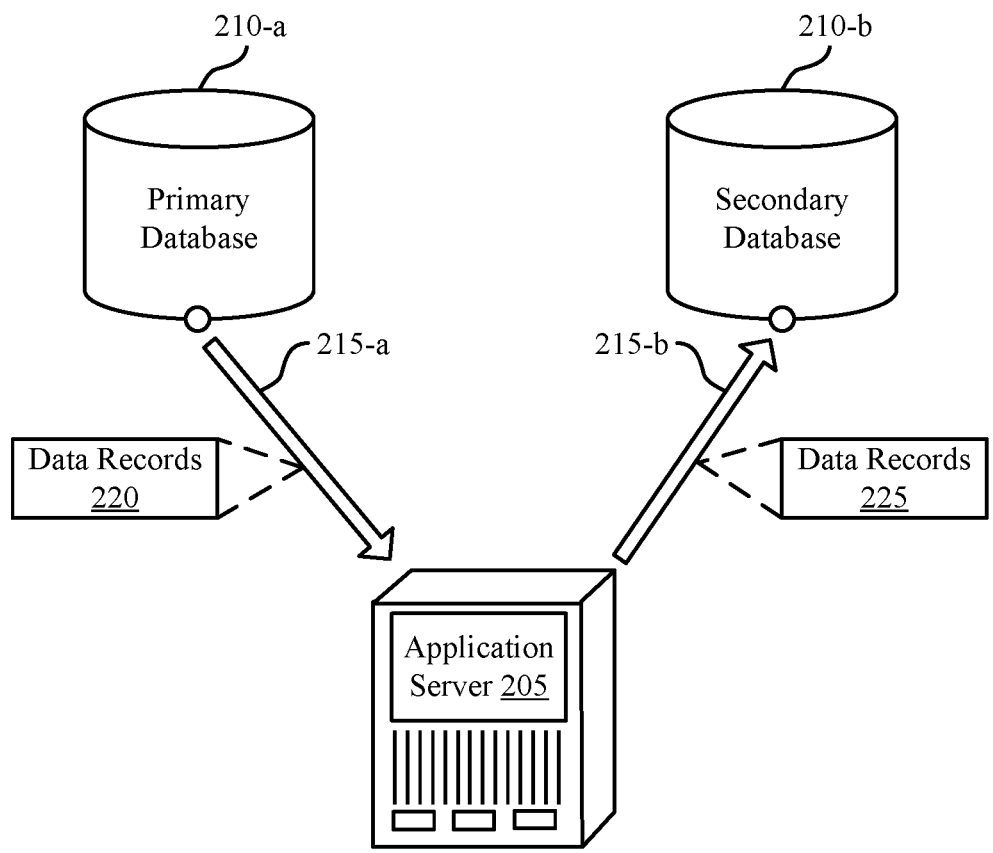
FIG. 2 illustrates an example of an archiving system that supports offloading data to a cold storage database in accordance with aspects of the present disclosure.

FIG. 2 illustrates an example of an archiving system 200 that supports offloading data to a cold storage database in accordance with aspects of the present disclosure. The archiving system 200 includes a number of database connections 215, a number of databases 210, and an application server 205. The system 200 may implement aspects of a system 100 as described with reference to FIG. 1. For example, a database 210 may be an example or component of a data center 120. The database connections 215 may allow the application server 205 to interact with data stored at the databases 210.

The application server 205 may represent aspects of an application server, communication server, data processing server, database server, cloud-based server, server cluster, virtual machine, container, or some similar data processing device or system. The application server 205 may communicate with other devices such as the databases 210. The databases 210 may implement various database ideologies (e.g., relational, non-relational, etc.). In some cases, primary database 210-a may be a relational database (e.g., a relational database management system (RDBMS)). In some cases, secondary database 210-b may be a non-relational database (e.g., a Hadoop distributed file system (HDFS), an HBase database, big objects storage, etc.). The application server 205 may use the database connections 215 to receive data from and/or transfer data to the databases 210. The database connections 215 may be shared connections (e.g., connections allowing multiple users or processes to connect to a database), unshared connections (e.g., connections allowing a single user or process to connect to a database), or a combination thereof.

According to one or more aspects of the present disclosure, the application server 205 may support a feature that may act as a background process. In some cases, the background process may run asynchronously across an application instance and may perform archiving for each tenant in a multi-tenant system. Due to its asynchronous nature, the background process may run automatically during off-hours (e.g., when the processing overhead at the database system is relatively low), supporting efficient usage of the processing resources of the database system. The application server 205 may be configured to read data from the primary database 210-a (e.g., an RDBMS) and perform a data-value copy to an archive record in the secondary database 210-b. The application server 205 may perform the archiving process in a multi-tenant environment while maintaining communication between two separate and ideologically different databases that do not support equal functionalities such as transactions, rollbacks, constant availability, or a combination thereof. Additionally or alternatively, in some cases, the application server 205 may not be able to establish uninterrupted connections with both the primary database 210-a and the secondary database 210-b concurrently. Thus, the present disclosure provides for moving data between databases of different types in a multi-tenant environment, without any adverse effect on a tenant's day-to-day operations.

The archiving process described herein may be divided into an asynchronous background queue, a functional job processor, and an archive job. The asynchronous background queue is described in further details with reference to FIG. 4, the functional job processor is described in further details with reference to FIG. 5, and the archive job is described in further details with reference to FIGS. 6 and 7. Each of the asynchronous background queue, the functional job processor, and the archive job may allow the application server 205 to operate without noticeable conflict with the day-to-day operations of the users of the multi-tenant system. For example, rather than specifying a strict schedule for the archiving process that could potentially conflict with other processes at the application server 205 or the database system, the application server 205 may automatically pop an archive job off the asynchronous background queue at an undetermined time (e.g., when processing overhead is low, such as below some processing threshold) and may execute the archive job using the available processing resources.

The application server 205 may receive or monitor a data queue (e.g., the asynchronous background queue) indicating a set of archiving jobs. For example, as previously discussed, the set of archiving jobs may be maintained as an asynchronous background queue, such as a cron job. An automated process (e.g., a process based on resource availability, a scheduled process, a periodic or aperiodic re-try process, etc.) may identify one or more data records 220 to write to the secondary database 210-b. The application server 205 may receive the set of archiving jobs from the primary database 210-a, another server maintaining the message queue, a user device, or another component of the application server 205. In some cases, the application server 205 may trigger dequeuing of a batch of the set of archiving jobs based on an amount of available processing resources at the application server 205 being greater than a first threshold amount of processing resources (or, similarly, an amount of available database resources for primary database 210-a, secondary database 210-b, or both being greater than a first threshold amount of database resources).

Upon identifying the first batch of the set of archiving jobs, the application server 205 may send the first batch of the set of archiving jobs to a functional job processor based on the triggered dequeuing. In some cases, the functional job processor may update a state of each archiving job of the first batch of the set of archiving jobs. For example, the functional job processor may update the state of each archiving job to be new, running, paused, retrying, error, or complete. Based on running the functional job processor, the application server 205 may identify a set of data records 220 in the primary database 210-a based on the first batch of the set of archiving jobs. In some cases, the application server 205 may identify the set of data records 220 further based on the triggered dequeuing. The set of data records 220 may be stored in a first format supported by the primary database 210-a. In some cases, the set of data records 220 may, for example, include one or more child data records (e.g., records that are dependent from other records) associated with a single parent data record (e.g., a record that includes one or more records).

The application server 205 or an abstraction layer between the application server 205 and the primary database 210-*a* may filter a stored data record of the set of data records to obtain a filtered data record from the primary database 210-*a*. In some cases, the application server 205 may filter the stored data record using a first abstraction layer. In some examples, primary database 210-*a* and/or secondary database 210-*b* may provide an abstraction layer (e.g., an object relational mapper (ORM), application programming interface (API), database management system (DBMS), etc.) for interacting with the database. The abstraction layer may sit on top of the database and manage data entering and/or exiting the database. The application server 205, via the abstraction layer and over a database connection 215-*a*, may filter the set of data records 220 identified from the primary database 210-*a* to determine a subset of the set of information for the stored data records. In some cases, the set of data records 220 stored in primary database 210-*a* may include a first set of fields visible to a tenant and a second set of fields hidden from the tenant (e.g., where a tenant may not be able to access the hidden fields using a query). The application server 205 may filter the set of data records 220 to retrieve the first set of fields visible to the tenant for the filtered data record (e.g., but not the second set of fields hidden from the tenant).

Upon successful retrieval of the filtered data records 220, the application server 205 may transform the filtered data records from a first format (i.e., a format supported by the primary database 210-*a*) to a second format different from the first format and supported by the secondary database 210-*b*. That is, as part of the archiving process, the application server 205 may reformat data records to be compatible with a particular ideology of a database 210 (e.g., supported formats, design principles, etc.). In some cases, the application server 205 may reformat the data records 220 to generate the data records 225. In some cases, the application server 205 may lock access to a data record while performing the archiving process on the data record. For example, the application server 205 may lock a data record at the primary database 210-*a* while transforming and writing the data record to the secondary database 210-*b*. In some cases, the primary database 210-*a* may not be able to modify the locked data record while the data record is being archived at the secondary database 210-*b*. In this way, the application server 205 may ensure that the data record written to secondary database 210-*b* is the latest version of the data record in primary database 210-*a*.

In some cases, the application server 205 may write the transformed data records 225 (such as a set of key-value pairs) to the secondary database 210-*b* via a database connection 215-*b*, a second abstraction layer, or both. In some examples, the data records 225 may include the same records as the data records 220. In some examples, the data records 225 may be in a different format than the data records 220. In some examples, the application server 205 may archive records that are re-formatted. As such, the application server 205 may archive the data records 220 from primary database 210-*a* to secondary database 210-*b* as data records 225 in a data archiving process. The application server 205 may send the transformed set of data records 225 to the secondary database 210-*b* according to a set of batches. For example, each batch of the set of batches may include a number of data records that is less than a threshold number of data records supported by a writing process of the second abstraction layer of the secondary database 210-*b*. In some examples, the application server 205 may receive a confirmation message indicating successful storage of the transformed set of data records 225 at the secondary database 210-*b*. This confirmation message may be sent from the secondary database 210-*b* and may be in response to sending the transformed set of data records to the secondary database 210-*b* for storage.

Upon receiving the confirmation message, the application server 205 may increment a watermark in the primary database 210-*a*. In some examples, the application server 205 may maintain a watermark associated with the archiving process from the primary database 210-*a*. In some examples, the watermark may include a creation date. Thus, incrementing the watermark may include setting the creation date for the watermark to a latest creation date of a data record in the set of data records 220. For example, the application server 205 may determine the latest creation date for a data record of the latest batch of data records copied from the primary database 210-*a* into the secondary database 210-*b*. Upon successful archiving of the latest batch of the data records, the application server 205 may update the watermark to reflect the latest creation date of this latest batch of the data records. In some examples, the watermark may correspond to a particular tenant in the primary database 210-*a*, a particular type of data record in the primary database 210-*a*, or a combination. That is, the primary database 210-*a* may maintain separate watermarks for different tables in memory, different tenants, or both. By utilizing watermarks based on creation dates, the archiving process may archive the oldest data created at primary database 210-*a* first.

In some cases, the application server 205 may identify data records to be deleted from primary database 210-*a*. In some examples, the records identified for deletion may include all records that were successfully written to secondary database 210-*b* during the archiving process. For example, the application server 205 may identify that all records of the data records 220 are to be deleted from the primary database 210-*a* based on receiving a confirmation message from the secondary database 210-*b*. In some examples, the application server 205 may send, to the primary database 210-*a* via the first abstraction layer, a delete request for the locked data records based on the confirmation message (e.g., where the locked data records are the data records 220 retrieved for archiving). The primary database 210-*a* may delete some or all of the data records identified for deletion (for example, in response to receiving the delete request). In some cases, all the data records 220 may be deleted from primary database 210-*a*. Deleting the data records that were identified for deletion may preserve data integrity, system reliability, and free up space at primary database 210-*a*. Alternatively, the application server 205 may receive an error message indicating unsuccessful storage of one or more of the transformed data records 225 at the secondary database 210-*b*. In such cases, the application server 205 may unlock the corresponding one or more locked data records at the primary database 210-*a* based on receiving the error message.

One or more aspects of the present disclosure provide for successful retrieval of archived data records. For instance, the application server 205 may receive a database query for a data record from a user device (not shown). Upon receiving the database query, the application server 205 may determine whether the data record is stored in the primary database 210-*a* or the secondary database 210-*b*. That is, the application server 205 may determine whether the data record is stored in the primary database 210-*a* supporting low-latency data access or is archived in the secondary database 210-*b*. Upon identifying the database storing the record, the application server 205 may send the database query to the primary database 210-*a* or the secondary database 210-*b*. Alternatively, the database query may go directly to primary database 210-*a*. If the requested data record is not found in primary database 210-*a*, the database query may be forwarded to secondary database 210-*b* (e.g., by primary database 210-*a*, the application server 205, etc.) for processing (in case the requested data record has been archived).

Thus, aspects of the present disclosure provide for an efficient archiving process while maintaining communications between two databases and handling many unknown and non-deterministic failures such as network outages, database malfunctions, database compactions, and network timeouts. Furthermore, the archiving process described herein overcomes such failures while simultaneously being reliable and efficient when archiving data from a first database to a second database.

Figure 3:
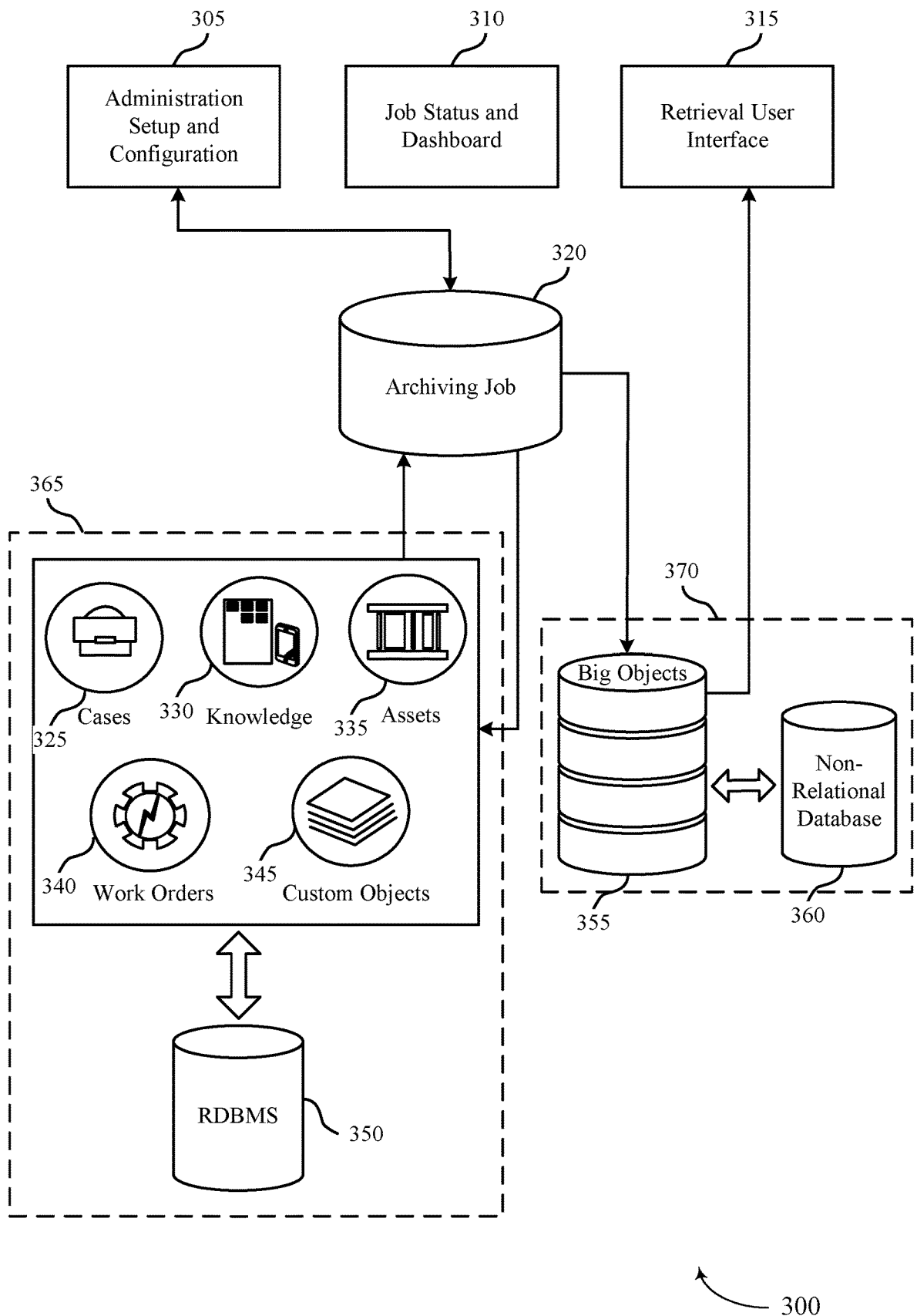
FIG. 3 illustrates an example of an archiving project that supports offloading data to a cold storage database in accordance with aspects of the present disclosure.

FIG. 3 illustrates an example of an archiving project 300 that supports offloading data to a cold storage database in accordance with aspects of the present disclosure. The RDBMS 350 may be an example of a primary database 210-*a* as described with reference to FIG. 2 and the non-relational database 360, the big objects store 355, or a combination thereof may be an example of secondary database 210-*b* as described with reference to FIG. 2. The primary storage system 365 may store data records related to one or more object or information types, such as data related to cases 325, a knowledge base 330, assets 335, work orders 340, custom objects 345, or a combination thereof. Additionally or alternatively, an archiving job may be configured to archive other types of objects. Cases 325, knowledge bases 330, assets 335, work orders 340, and custom objects 345 may be examples of top-level data entities in the primary storage system 365. The RDBMS 350 may support low-latency querying of such data records in the primary storage system 365. The secondary storage system 370 may include a big objects store 355, a non-relational database 360, or both. In some cases, a user (e.g., an administrative user) may setup and configure an archiving process using an administration setup and configuration 305. For example, the user may set the frequency of archiving, at what time of day archiving should occur, for which tenants to perform archiving, etc. The dashboard 310 may allow users to view information such as a status of an archiving job (or other processing jobs). The retrieval user interface (UI) 315 may display (e.g., on a user device) data retrieved from the database system, including data retrieved from the RDBMS 350, the big objects store 355, the non-relational database 360 (e.g., an HBase database), or any combination thereof. The job scheduler 320 (e.g., a cron job scheduler) may schedule jobs and processes for archiving data records. In some examples, archiving processes may be initiated by the job status and dashboard 310 (e.g., based on a user input to a user device) or the job scheduler 320.

In some cases, the RDBMS 350 may support the use of structured data. In some examples, an RDBMS 350 may support filtering and sorting of data and may provide rapid access to data. In some examples, the RDBMS 350 may be used as a primary store of data for an application, organization, or service (e.g., a CRM application may run on the RDBMS 350). In some cases, the non-relational database 360 may support the use of semi-structured or non-structured data. In some examples, the non-relational database 360 may support the storage of large amounts of data and may be used as a secondary data store. For example, the non-relational database 360 may store data that is not accessed often, but is maintained in accordance with a policy, a law, a user configuration, or any combination thereof. To increase data storage space at the RDBMS 350, the job scheduler 320 may perform data archiving jobs to move data from storage at the RDBMS 350 to long-term storage at the non-relational database 360. The job scheduler 320 may implement offloading process as described herein for the archiving process (e.g., where a cron job may retrieve data records from data rows in a primary storage system 365 and may store the data records as big objects in a secondary storage system 370). In some cases, the job scheduler 320 may opportunistically archive records (e.g., based on available processing resources, an expected processing load on the database system, etc.). As such, the data archiving process may be transparent to users accessing data in the database system.

Figure 4:
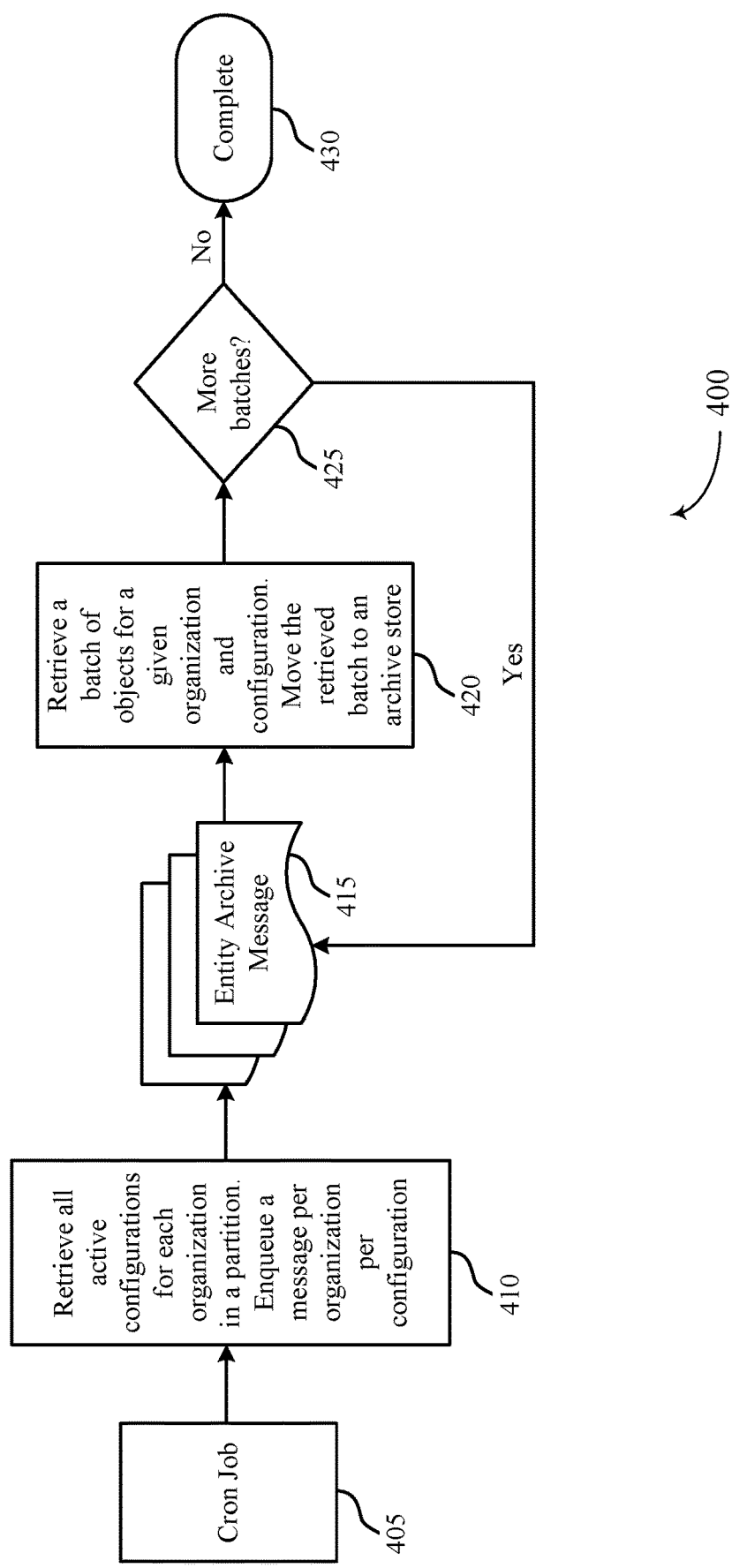
FIG. 4 illustrates an example of an asynchronous background process that supports offloading data to a cold storage database in accordance with aspects of the present disclosure.

FIG. 4 illustrates an example of an asynchronous background process 400 that supports offloading data to a cold storage database in accordance with aspects of the present disclosure. As previously described with reference to FIG. 2, the asynchronous background process 400 may be implemented using an application server which may be an example of an application server 205 as described with reference to FIG. 2. In some examples, the asynchronous background process 400 may include a stream of events. The application server may be configured to maintain the asynchronous background process 400, which may be an example of a cron job including a set of jobs (e.g., an immutable set of jobs) associated with one or more tenants. A message in the asynchronous background process 400 may include an identifier or a set of identifiers for a set of data records to be retrieved from a primary database and archived to a secondary database. The primary database may be an example of a primary database 210-*a* as described with reference to FIG. 2 and the secondary database may be an example of a secondary database 210-*b* as described with reference to FIG. 2. In some examples, the application server may process a job from the asynchronous background process 400 during off-peak hours.

At 405, the application server may identify a cron job. For example, the application server may manage the cron job, where the cron job acts as an asynchronous background queue holding archive jobs. The cron job may be associated with multiple organizations (i.e., tenants in a multi-tenant system). At 410, the application server may retrieve all active configurations for each organization in a partition. Additionally, the application server may enqueue a message per organization per configuration. Enqueuing the messages may involve creating an archive job per organization per configuration, where the messages are examples of entity archive messages. At 415, the application server may save the archive jobs (e.g., as messages) in the "EntityArchiveMessage" stack.

At 420, the application server may retrieve a first batch of objects for a given organization and configuration (e.g., according to a next message in the "EntityArchiveMessage" stack). The application server may move the batch of objects to an archive store. In some examples, this may involve the application server retrieving a job from the queue (identified via the cron job) and sending the retrieved job to a functional job processor for handling. At 425, the application server may determine whether there are additional batches to process (e.g., additional messages in the "EntityArchiveMessage" stack). If the application server determines that there are additional batches to process, the application server may retrieve another batch of objects according to a next message in the "EntityArchiveMessage" stack. If the application server determines that there are currently no further batches to process, at 430, the application server may complete the cron job.

Figure 5:
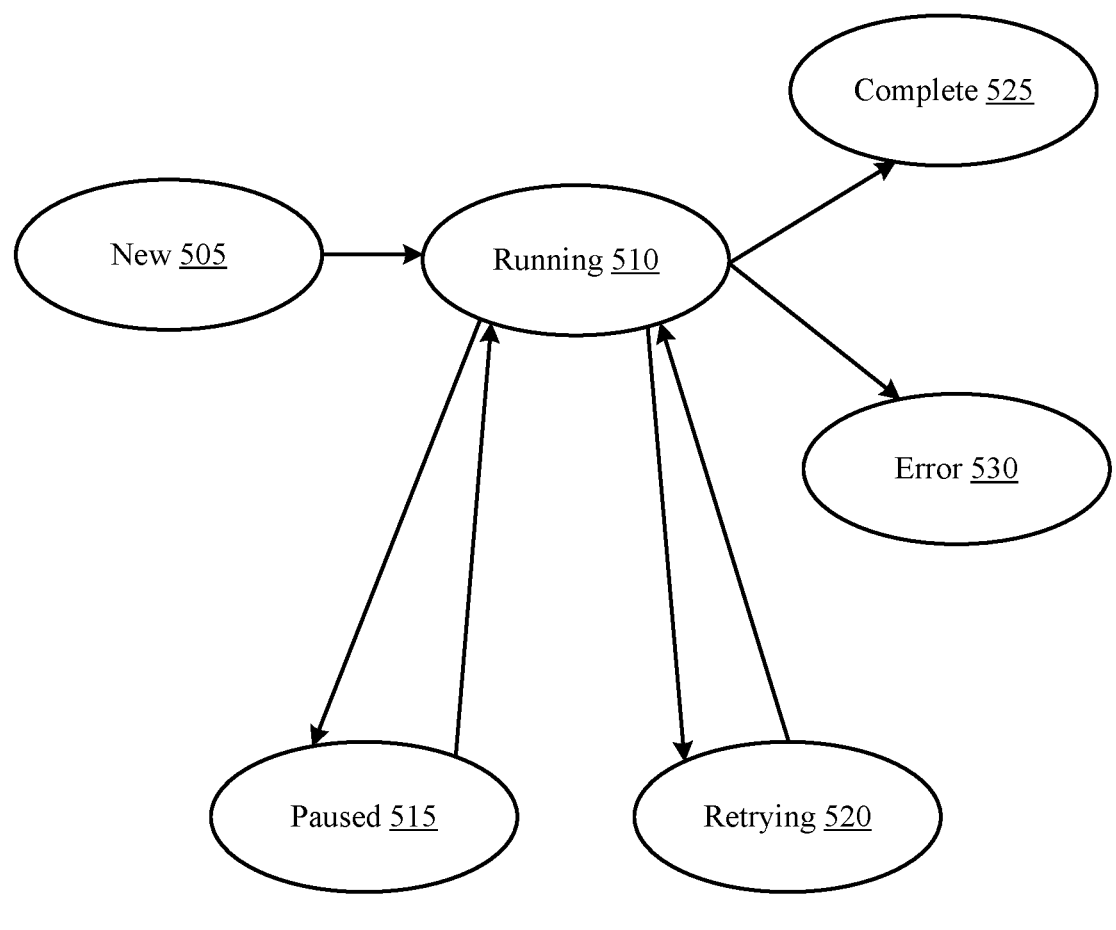
FIG. 5 illustrates an example of a finite state machine that supports offloading data to a cold storage database in accordance with aspects of the present disclosure.

FIG. 5 illustrates an example of a finite state machine 500 that supports offloading data to a cold storage database in accordance with aspects of the present disclosure. The finite state machine 500 may be implemented using an application server which may be an example of an application server 205 as described with reference to FIG. 2. Upon triggering dequeuing of an archiving job as described with reference to FIG. 4, the application server may send the archiving job to a functional job processor based on the triggered dequeuing. The functional job processor may implement the finite state machine 500 to update a state of each archiving job executed at the functional job processor. That is, an archiving job may act as a finite state machine 500, where the functional job processor traverses the states of the archiving job. The finite state machine 500 may identify a known state of a set of states for each archiving job. In some examples, the functional job processor may implement the finite state machine 500 to update a state of each archiving job by advancing in a single direction to traverse the states (e.g., from an entry state to an end state).

In some examples, the functional job processor may not contain any state by itself. Instead, the functional job processor may act as a purely functional operation that can be re-run any number of times without leaking a state to other concurrent archiving jobs. In some instances, the functional job processor may process an archiving job atomically. For example, the functional job processor may traverse the state of the archiving job completely (e.g., without getting stuck between states). In one example, the functional job processor may traverse the states from new 505 (e.g., an entry state) to running 510 to paused 515, retrying 520, complete 525, and/or error 530. That is, once in a running 510 state, the job may switch between running 510, paused 515, and retrying 520 any number of times. The job may finish traversing the states once it moves from the running 510 state to either a complete 525 or error 530 state (e.g., an end state). In some cases, the functional job processor may process an archiving job idempotently (e.g., maintaining the state of the archiving job in an idempotent way). For example, the functional job processor may be able to be run the finite state machine 500 associated with the same archiving job without a change to its output. That is, given a set input X, functional job processor may be able to always return the expected output Y. Additionally or alternatively, the functional job processor may process an archiving job in an organization-agnostic (i.e., tenant-agnostic) manner. In some examples, the archiving process described herein may run below an application level and directly on the application server (e.g., directly on an application instance running on the application server, which may be an example of a cluster of servers). This allows the application server to identify and process each organization (such as tenants within the multi-tenant database) individually without data leakage or performance loss between organizations (e.g., organizations contained within the same application instance and operating alongside one another without interference). In some examples, the archiving process may include context associated with each organization and the functional job processor may operate on the archiving process in an atomic and idempotent manner.

According to one or more aspects of the present disclosure, the functional job processor may implement the finite state machine 500 to traverse its states. As described herein, the current state of each archiving job executed at the functional job processor may be new 505, running 510, paused 515, retrying 520, complete 525, or error 530. In some examples, allowing the functional job processor to change the state of an archiving job according to the finite state machine 500 may act as a concurrency control mechanism for the overall archiving job. When operating in a distributed server environment, there may be many threads accessing the same resources at once. The functional job processor may ensure that the threads can obtain resources without interfering with each other and without introducing data loss or database locking timeouts.

In some cases, upon receiving an archiving job, the functional job processor may update the status of the archiving job to be new 505. The functional job processor may then update the status of the archiving job in a running stage to cycle between running 510 and paused 515. For example, if there are sufficient processing resources available to process an archiving job, the functional job processor may update the state of the archiving job to running 510 and may perform data archiving while the archiving job is running. If the available processing resources drops below a particular level (e.g., below a threshold level of processing resources), the functional job processor may update the state of the archiving job to paused 515 and may not perform data archiving while the archiving job is paused. In this way, if the application server or the database system receives a significant influx of user traffic (e.g., such that the processing resources used to handle the user traffic exceed a threshold), the functional job processor may pause the archiving job in real-time (or pseudo-real-time) to support handling the heavy overhead from the user traffic. This allows the finite state machine 500 to run within a dynamic environment (e.g., with many users and/or tenants).

If the functional job processor determines that the primary database or the secondary database is down (or a database connection with one of these databases is down), the functional job processor may update the status of the archiving job to be retrying 520. For example, the functional job processor may transfer the archiving job back into a queue and wait for a time period. The functional job processor may periodically or aperiodically retry the archiving job to check if the application server can successfully read data from or write data to the database. The functional job processor may update the status of the archiving job to running 510 once the retrying is successful. If the archiving job is completed successfully (e.g., the data records associated with the archiving job are successfully read from the primary database, written to the secondary database, deleted from the primary database, etc.), the functional job processor may update the status of the archiving job to be complete 525. Alternatively, if the archiving job is unsuccessful (e.g., a threshold number of retries fail for the job or an error is determined to be unrecoverable), the functional job processor may update the status of the archiving job to be error 530.

In some cases, an archive job may run according to a schedule (e.g., once a day during off-hours for the corresponding tenant). If an archiving job lasts longer than the scheduled periodicity (e.g., a job running once a day takes longer than a day to move from new 505 to complete 525), the application server may skip one or more scheduled archiving jobs. This may occur if the archiving job is paused 515 or retrying 520 for a significant period of time (e.g., due to issues with a database connection, due to heavy user traffic in the system, etc.).

Figure 6:
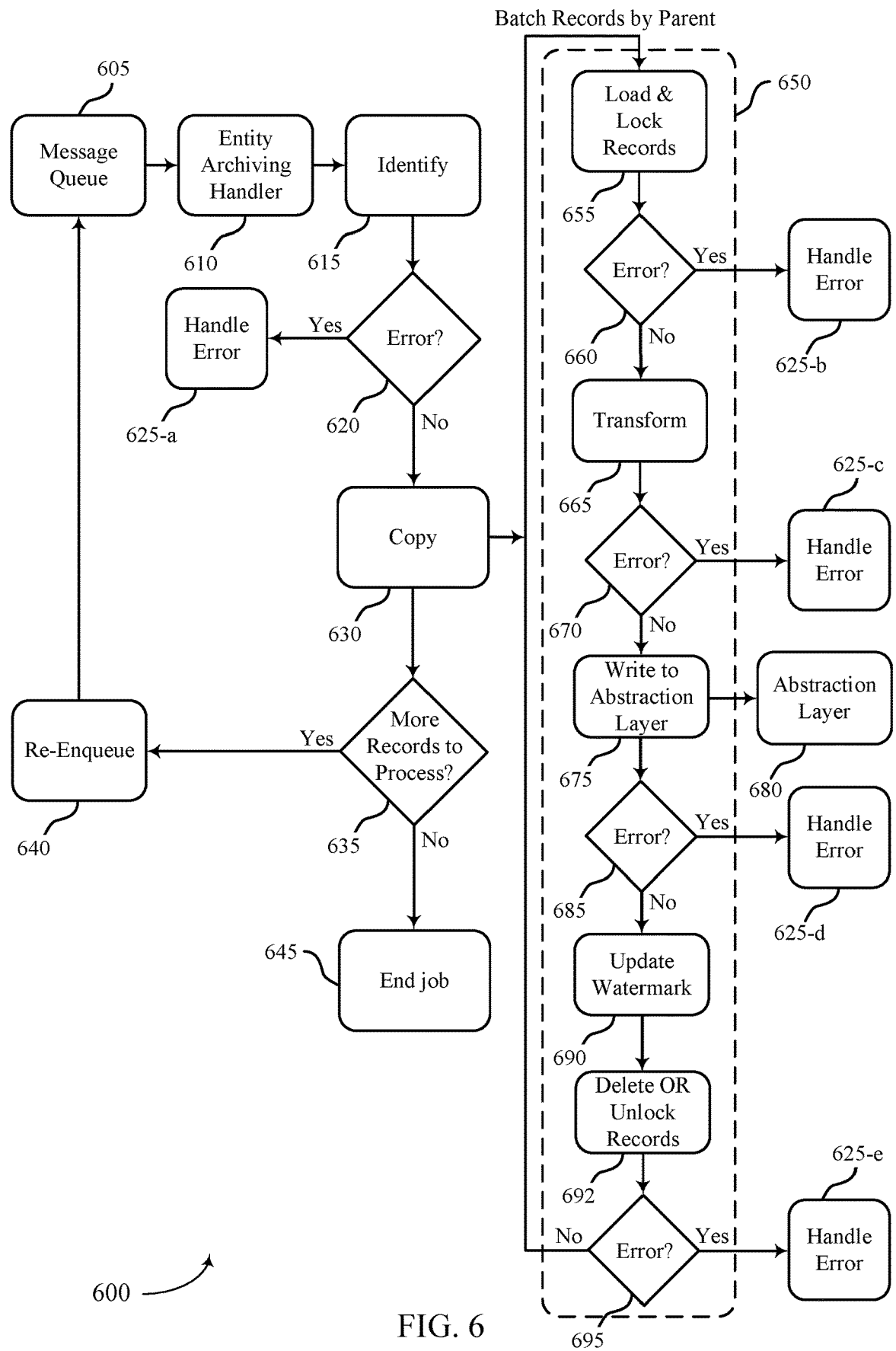
FIG. 6 illustrates an example of a data archiving process that supports offloading data to a cold storage database in accordance with aspects of the present disclosure.

FIG. 6 illustrates an example of a data archiving process 600 that supports offloading data to a cold storage database in accordance with aspects of the present disclosure. The data archiving process 600 may be implemented using an application server which may be an example of an application server 205 as described with reference to FIG. 2. The application server may execute the steps of the data archiving process 600 to implement offloading of data from a first database (e.g., a primary database) to a second database (e.g., a secondary database). The first database may be an example of a primary database 210-a as described with reference to FIG. 2 and the second database may be an example of secondary database 210-b as described with reference to FIG. 2. The data archiving process 600 may support reliably offloading data to cold storage in a volatile, multi-tenant environment.

At 605, a server (e.g., an application server 205 as described with reference to FIG. 2) may maintain or receive a message queue including a set of archiving jobs. The message queue may be a background queue that operates according to the method described with reference to FIG. 4. The message queue may reside within the application server. In some examples, the message queue may include one or more messages that describes for a job handler how to identify certain data records (i.e., the data records for the archive job defined by the respective message). At 610, the application server may process a message from the message queue. In some cases, processing the message may involve dequeuing the message from the message queue and attempting to execute the message at an entity archiving handler. The dequeuing may be triggered automatically (e.g., by a scheduled process, based on a resource availability, etc.). For instance, the dequeuing may be triggered without any user interaction. The entity archiving handler may be an example of a job processor running at the application server.

At 615, the application server may identify records for an archiving process. For instance, the application server may identify a set of data records in the first database (such as an RDBMS) based on a first batch of records defined in the message dequeued from the message queue at 610. In some cases, the set of data records may be stored in a first format supported by the first database, where each stored data record of the set of data records includes a set of information corresponding to that data record. In some cases, identifying the records may involve determining batches for retrieving the records from the first database. The application server may determine one or more database queries to copy the data records from the primary database. For example, a database query may specify which data records (e.g., data objects, rows, data fields, etc.) to select, from which database tables, any selection criteria, a timestamp range (e.g., the creation date is older than a watermark in the database), or some combination of these or other query parameters. The database query may be an example of a structured query language (SQL) query, an object-based query language query, or any other type of query supported by the first database.

At 620, the application server may determine if there is an error in identifying the records for the archiving process. If an error is determined, then the application server may handle the error at 625-a. The method for handling the error is further described with reference to FIG. 7.

At 630, the application server may copy the identified records from the first database. In some cases, the application server may issue database commands (e.g., one or more database queries) to copy the identified records. These database commands may not query database tables in the first database directly, but may be handled by one or more abstraction layers at the first database (e.g., similar to how a user for a tenant may access data in the first database). In some cases, the application server may copy the identified records in batches (where the data records may be batched by parents). In some cases, to copy the data records, the application server or first database may filter, at a first abstraction layer, the copied data records to obtain a filtered set of data records. In some examples, each filtered data record may include a subset of a set of information for the stored data record. That is, the filtered data record may include a first set of fields visible to a tenant and may not include a second set of fields hidden from the tenant. The hidden fields may include fields used internally for searching in the first database, fields used by administrators (but not tenants), fields used to internally link data records together within the first database, some metadata associated with the data records, or any combination of these or other hidden fields in the first database. The application server may receive the filtered data records via the first abstraction layer of the first database. The application server may archive the filtered data records at 650, which may or may not involve the copying process. For example, for each batch of data records associated with the message dequeued at 610, the application server may perform the archiving process at 650. Each batch may include a parent data record and any child data records depending from the parent data record. In some cases, a batch may include multiple parent records and the corresponding children (e.g., such that the batch of records contains a number of data records that is less than a batching threshold for reading from the first database, writing to the second database, or both).

At 655, the application server may load a batch of data records and lock the stored data records at the first database based on receiving the filtered data records, where the first database may refrain from modifying the locked data records. That is, if the first database receives an input to modify a locked data record (e.g., from a user, from another process, etc.), the first database may refrain from modifying the locked data record. Alternatively, in some cases, the first database may not lock the data records at 655. The loading process may involve loading data records how a user may view the data records (e.g., without hidden fields). At 660, the application server may determine if there is an error in loading and locking the stored data records. If an error is determined, then the application server may handle the error at 625-b.

At 665, the application server may transform the received data records (e.g., the filtered data records) from the first format to a second format different from the first format and supported by the second database. For example, the application server may transform the data records into a format (such as a key-value pair) supported by the second database using data type casting or another data transformation procedure. At 670, the application server may determine if there is an error in transforming the received data record. If an error is determined, then the application server may handle the error at 625-c.

At 675, the application server may write, via a second abstraction layer 680 (e.g., a Pliny layer for HBase), the transformed data records to the second database. In some examples, the application server may send the transformed set of data records to the second database according to a set of batches. In some examples, each batch of the set of batches may include a number of data records that is less than a threshold number of data records supported by a writing process of the second abstraction layer 680. For example, a Pliny API may have an associated size limit, complexity limit, or both for write requests, and the application server may batch the write requests to comply with one or more of these limits. The application server may transmit, to the second abstraction layer 680, a request to write the data records to the second database. At 685, the application server may determine if there is an error in writing the transformed data records to the second database. If an error is determined, then the application server may handle the error at 625-*d*.

In some examples, the application server may receive, from the second database and in response to sending the transformed data records to the second database, a confirmation message indicating successful storage of the transformed data records at the second database. In response to receiving the confirmation message, the application server may update a watermark in the first database based on the confirmation message at 690. In some examples, the watermark may include a creation date, and updating the watermark may include incrementing the watermark to set the creation date for the watermark to a latest creation date of a data record in the set of data records (e.g., for the current batch). In some cases, the application server may update the watermark after writing each batch or may update the watermark after all of the records for an archiving job are processed.

At 692, the application server may send a delete request for the locked data records based on the confirmation message. For example, the application server may send the delete request to the first database via the first abstraction layer. The application server may delete records from the first database by sending the delete request. The application server may permanently delete some or all of the records identified at 615 from the first database. For example, if the batch of records archived at 650 is successfully written to the second database, the first database may permanently delete this batch of records stored at the first database. Additionally or alternatively, the application server may receive, from the second database and in response to sending the transformed data records to the second database, an error message indicating unsuccessful storage of the transformed data records—or a subset of the transformed data records—at the second database. In such cases, the application server may unlock the locked data records at the first database. For example, the application server may unlock any data records in the first database that are not successfully archived at the second database. In some cases, the unlocking may occur after one or more retry processes to successfully archive the data records fail at the second database. Unlocking records may be based on parent and children data records. For example, if even one child data record is not archived successfully, the application server may unlock (e.g., rather than delete) the corresponding parent record in the first database.

At 695, the application server may determine if there is an error unlocking or deleting a data record. If an error is determined, then the application server may handle the error at 625-*e*. If no error is determined, the application server may continue to perform the data archiving at 650 on each successive batch of data records indicated in the message for the archiving job. At 635, the application server may determine whether there are more data records to process. If there are more data records to process, then at 640, the application server may re-enqueue the data records as archiving jobs in the message queue. If there are no more data records to process, then the application server may end the archiving job at 645.

One or more application servers may perform data archiving processes 600 for a multi-tenant database system. For example, one or more servers may run an active job for each top-level data entity per tenant. Each active job may have its own corresponding watermark in the first database tracking the progress of the active job. As each top-level data entity may correspond to a separate database table in the first database, each database table may have a table-specific watermark for a particular tenant.

Figure 7:
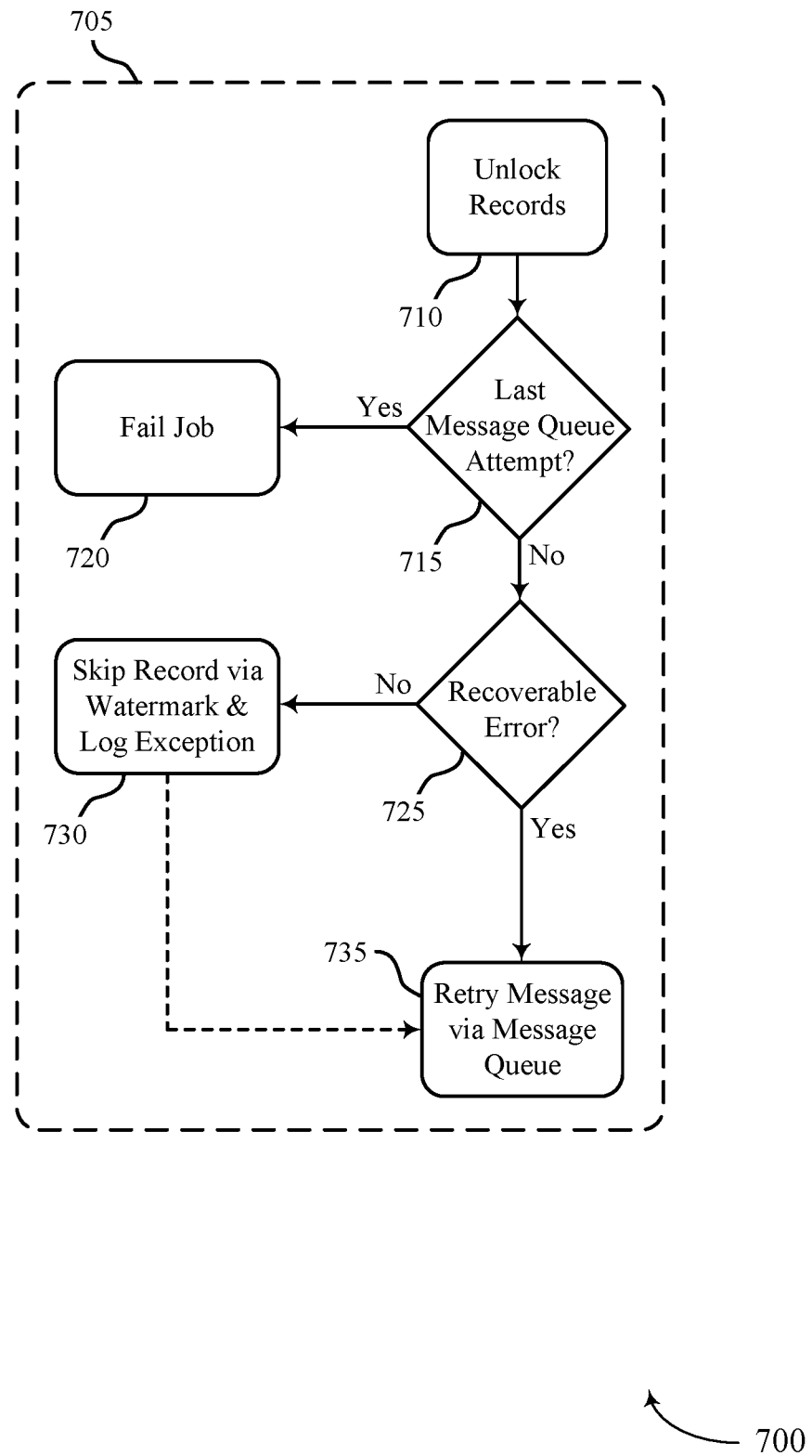
FIG. 7 illustrates an example of an error handling process that supports offloading data to a cold storage database in accordance with aspects of the present disclosure.

FIG. 7 illustrates an example of an error handling process 700 that supports offloading data to a cold storage database in accordance with aspects of the present disclosure. The error handling process 700 may be implemented using an application server which may be an example of an application server 205 as described with reference to FIG. 2. The application server may execute the steps of the error handling process 700 to handle errors while offloading data from a first database (e.g., a primary database) to a second database (e.g., a secondary database). The first database may be an example of a primary database 210-*a* as described with reference to FIG. 2 and the second database may be an example of secondary database 210-*b* as described with reference to FIG. 2. The error handling process 700 may include the method 705 for handling the errors described with reference to FIG. 6 (such as handing errors at 625-*a*, 625-*b*, 625*c*, 625-*d*, and 625-*e*).

At 710, upon receiving an error indication, the application server may unlock the records associated with the error indication. For example, the application server may determine that there was an error indicating unsuccessful storage of one or more data records at the second database. The application server may unlock the data records in response to determining the unsuccessful storage.

At 715, the application server may determine whether this is a final attempt for a message queue to store the one or more data records (i.e., the data records which encountered an error). If the application server determines that this is the final attempt, then at 720, the application server may determine that the archiving job associated with the one or more data records has failed. If the application server determines that this is not the final attempt, then at 725, the application server may determine whether the error is recoverable. If the application server determines that the error is not recoverable, then at 730, the application server may skip the data record from archiving and log an exception associated with the data record. In some cases, the application server may skip the data record from archiving via a watermark. Alternatively, if the application server determines that the error is recoverable, then at 735, the application server may retry processing the data record from the message queue (e.g., attempting to copy, filter, transform, and write the data record in a data archiving process).

The error handling process 700 may support handling errors encountered by a functional job processor reading data from a primary database and writing the data to a secondary database. These errors may occur based on a network outage, a database malfunction, a database compaction process, a network timeout, a dropped database connection, or a combination thereof. In some cases, errors may be due to the primary database being a relational, transactional data store, and the secondary database having no concept of transactions or rollback processes. The error handling process 700 may catch these errors and perform processing to mitigate data issues within the database system.

Figure 8:
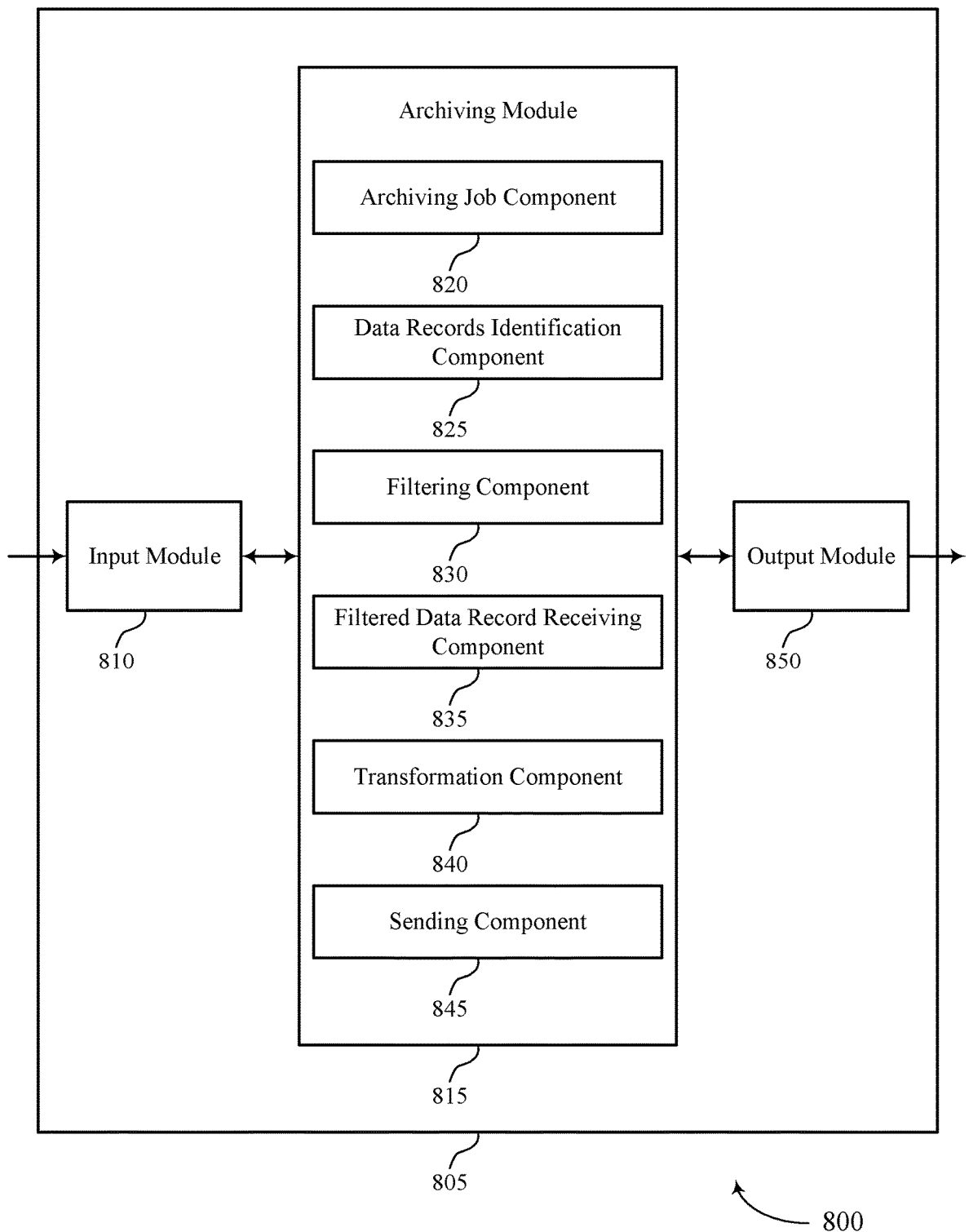
FIG. 8 shows a block diagram of an apparatus that supports offloading data to a cold storage database in accordance with aspects of the present disclosure.

FIG. 8 shows a block diagram 800 of an apparatus 805 that supports offloading data to a cold storage database in accordance with aspects of the present disclosure. The apparatus 805 may include an input module 810, an archiving module 815, and an output module 850. The apparatus 805 may also include a processor. Each of these components may be in communication with one another (e.g., via one or more buses). In some cases, the apparatus 805 may be an example of a user terminal, a database server, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the archiving module 815 to support offloading data to a cold storage database. In some cases, the input module 810 may be a component of an input/output (I/O) controller 1015 as described with reference to FIG. 10.

The archiving module 815 may include an archiving job component 820, a data records identification component 825, a filtering component 830, a filtered data record receiving component 835, a transformation component 840, and a sending component 845. The archiving module 815 may be an example of aspects of the archiving module 905 or 1010 described with reference to FIGS. 9 and 10.

The archiving module 815 and/or at least some of its various sub-components may be implemented in hardware, software executed by a processor, firmware, or any combination thereof. If implemented in software executed by a processor, the functions of the archiving module 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The archiving module 815 and/or at least some of its various sub-components may be physically located at various positions, including being distributed such that portions of functions are implemented at different physical locations by one or more physical devices. In some examples, the archiving module 815 and/or at least some of its various sub-components may be a separate and distinct component in accordance with various aspects of the present disclosure. In other examples, the archiving module 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The archiving module 815 may perform data archiving from a first database to a second database. The archiving job component 820 may receive, from the first database, a data queue indicating a set of archiving jobs. The data records identification component 825 may identify a set of data records in the first database based on a first batch of the set of archiving jobs, where the set of data records is stored in a first format supported by the first database and a stored data record of the set of data records includes a set of information. The filtering component 830 may filter, at a first abstraction layer and based on identifying the set of data records in the first database, the stored data record of the set of data records to obtain a filtered data record, where the filtered data record includes a subset of the set of information for the stored data record.

The filtered data record receiving component 835 may receive, via the first abstraction layer, the filtered data record of the set of data records based on the first batch of the set of archiving jobs. The transformation component 840 may transform the received data record from the first format to a second format different from the first format and supported by the second database. The sending component 845 may send, to the second database via a second abstraction layer, the transformed data record.

The output module 850 may manage output signals for the apparatus 805. For example, the output module 850 may receive signals from other components of the apparatus 805, such as the archiving module 815, and may transmit these signals to other components or devices. For example, the sending component 845 may be a component of or connected to the output module 850. In some specific examples, the output module 850 may transmit output signals for display in a user interface, for storage in a database or data store, for further processing at a server or server cluster, or for any other processes at any number of devices or systems. In some cases, the output module 850 may be a component of an I/O controller 1015 as described with reference to FIG. 10.

Figure 9:
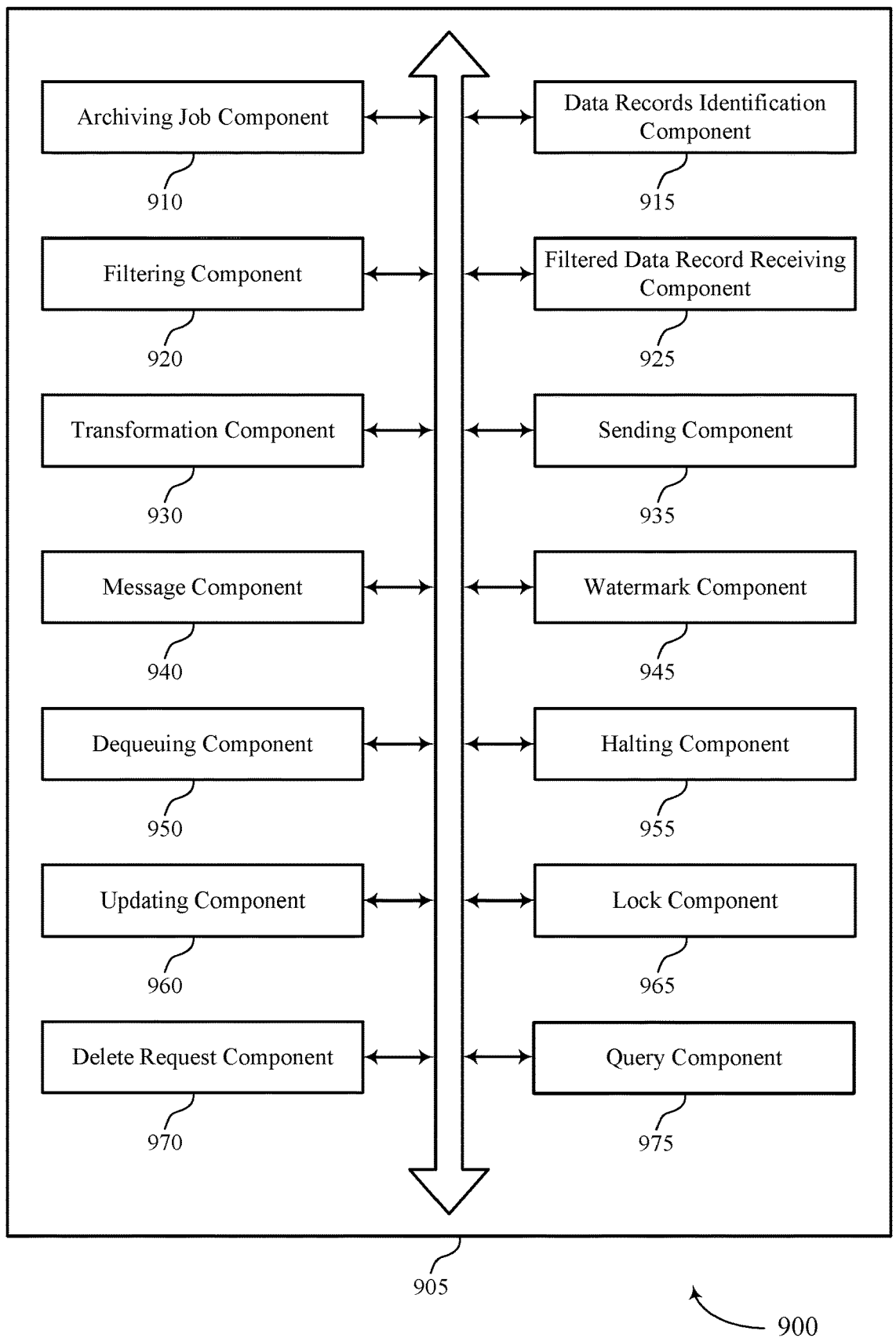
FIG. 9 shows a block diagram of an archiving module that supports offloading data to a cold storage database in accordance with aspects of the present disclosure.

FIG. 9 shows a block diagram 900 of an archiving module 905 that supports offloading data to a cold storage database in accordance with aspects of the present disclosure. The archiving module 905 may be an example of aspects of an archiving module 815 or an archiving module 1010 described herein. The archiving module 905 may include an archiving job component 910, a data records identification component 915, a filtering component 920, a filtered data record receiving component 925, a transformation component 930, a sending component 935, a message component 940, a watermark component 945, a dequeuing component 950, a halting component 955, an updating component 960, a lock component 965, a delete request component 970, and a query component 975. Each of these modules may communicate, directly or indirectly, with one another (e.g., via one or more buses). The archiving module 905 may support data archiving from a first database (e.g., a primary database) to a second database (e.g., a secondary database, such as a cold storage database). The archiving module 905 may be a component of an application server, a database server, a cloud-based server, a server cluster, a virtual machine, a container, or any other processing device or system supporting data archiving.

The archiving job component 910 may receive, from the first database, a data queue indicating a set of archiving jobs. In some cases, the first database includes a relational database. The data records identification component 915 may identify a set of data records in the first database based on a first batch of the set of archiving jobs, where the set of data records is stored in a first format supported by the first database and a stored data record of the set of data records includes a set of information. The filtering component 920 may filter, at a first abstraction layer and based on identifying the set of data records in the first database, the stored data record of the set of data records to obtain a filtered data record, where the filtered data record includes a subset of the set of information for the stored data record.

The filtered data record receiving component 925 may receive, via the first abstraction layer, the filtered data record of the set of data records based on the first batch of the set of archiving jobs. The transformation component 930 may transform the received data record from the first format to a second format different from the first format and supported by a second database. In some cases, the second database includes a non-relational database. The sending component 935 may send, to the second database via a second abstraction layer, the transformed data record.

In some examples, the filtering component 920 may filter, at the first abstraction layer and based on identifying the set of data records in the first database, the set of data records to obtain a filtered set of data records. In some examples, the filtered data record receiving component 925 may receive, via the first abstraction layer, the filtered set of data records based on the first batch of the set of archiving jobs.

In some examples, the transformation component 930 may transform the received set of data records from the first format to the second format. In some examples, the sending component 935 may send, to the second database via the second abstraction layer, the transformed set of data records. The message component 940 may receive, from the second database and in response to sending the transformed set of data records to the second database, a confirmation message indicating successful storage of the transformed set of data records at the second database.

The watermark component 945 may increment a watermark in the first database based on the confirmation message. In some examples, the watermark component 945 may set the creation date for the watermark to a latest creation date of a data record in the set of data records. In some cases, the watermark corresponds to a particular tenant in the first database, a particular type of data record in the first database, or a combination thereof.

In some examples, filtered data record receiving component 925 may receive the filtered set of data records according to a set of batches, where each batch of the set of batches includes a parent data record and any child data records for the parent data record. In some examples, sending component 935 may send the transformed set of data records to the second database according to a set of batches, where each batch of the set of batches includes a number of data records that is less than a threshold number of data records supported by a writing process of the second abstraction layer.

The dequeuing component 950 may trigger dequeuing of the first batch of the set of archiving jobs based on an amount of available processing resources at an application server (e.g., the application server performing the data archiving) being greater than a first threshold amount of processing resources, where the set of data records is identified based on the triggered dequeuing. The halting component 955 may halt the data archiving based on the amount of available processing resources at the application server being less than a second threshold amount of processing resources.

In some examples, the dequeuing component 950 may send the first batch of the set of archiving jobs to a functional job processor based on the triggered dequeuing. The updating component 960 may update, at the functional job processor, a state of each archiving job of the first batch of the set of archiving jobs based on the data archiving. In some cases, the state of each archiving job includes new, running, paused, retrying, error, or complete.

The lock component 965 may lock the stored data record at the first database based on receiving the filtered data record, where the first database may refrain from modifying the locked data record. In some examples, the message component 940 may receive, from the second database and in response to sending the transformed data record to the second database, a confirmation message indicating successful storage of the transformed data record at the second database. The delete request component 970 may send, to the first database via the first abstraction layer, a delete request for the locked data record based on the confirmation message. In some other examples, the message component 940 may receive, from the second database and in response to sending the transformed data record to the second database, an error message indicating unsuccessful storage of the transformed data record at the second database. In some examples, the lock component 965 may unlock the locked data record at the first database based on the error message.

In some examples, the set of information for the stored data record may include a first set of fields visible to a tenant and a second set of fields hidden from the tenant. The filtering component 920 may retrieve, from the first database and at the first abstraction layer, the first set of fields visible to the tenant for the filtered data record.

The query component 975 may receive, from a user device, a database query for a data record. In some examples, the data records identification component 915 may determine whether the data record is stored in the first database or the second database based on the data record and the data archiving. In some examples, the query component 975 may send the database query to the first database or the second database based on the determining.

Figure 10:
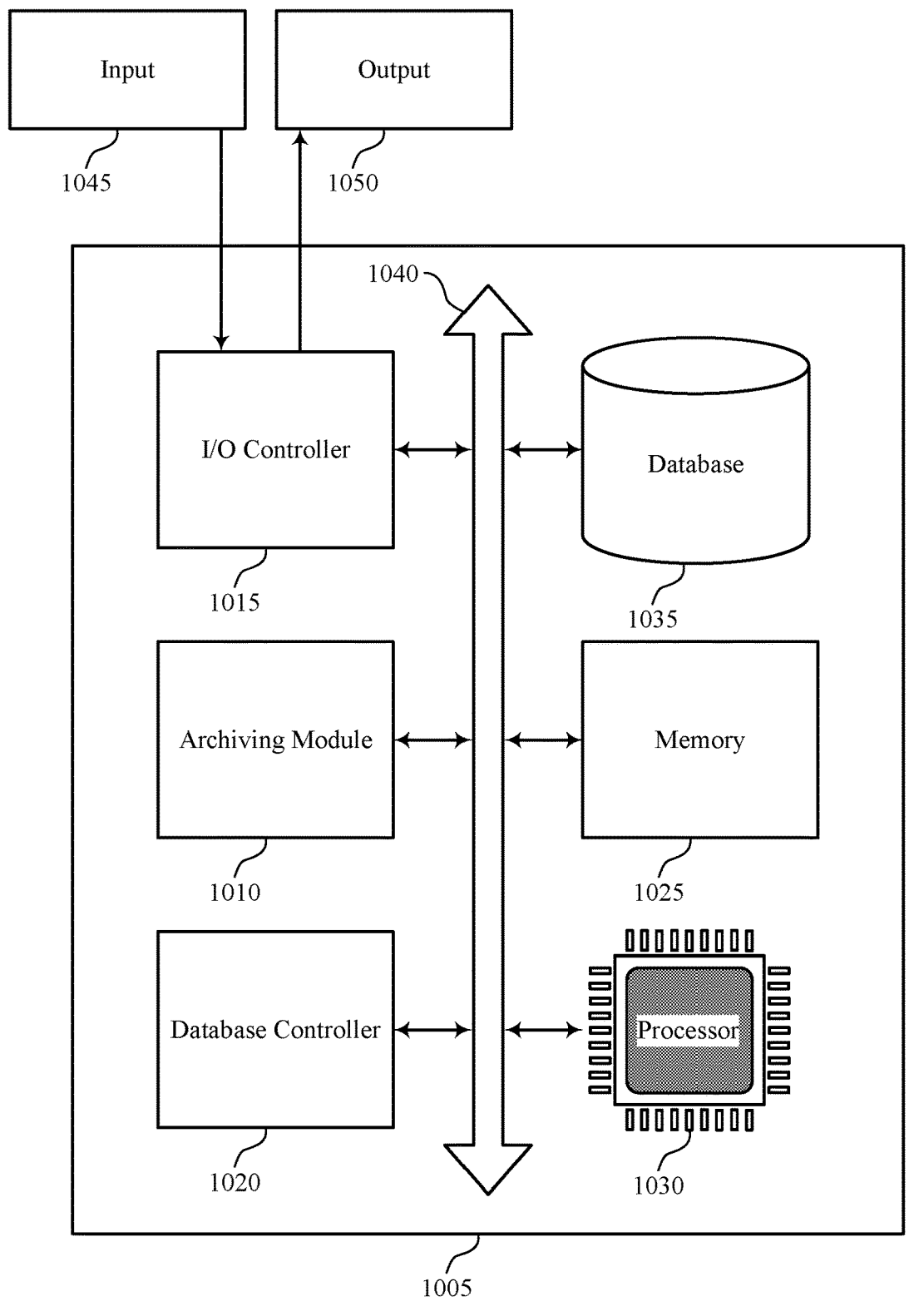
FIG. 10 shows a diagram of a system including a device that supports offloading data to a cold storage database in accordance with aspects of the present disclosure.

FIG. 10 shows a diagram of a system 1000 including a device 1005 that supports offloading data to a cold storage database in accordance with aspects of the present disclosure. The device 1005 may be an example of or include the components of an application server or an apparatus 805 as described herein. The device 1005 may include components for bi-directional data communications including components for transmitting and receiving communications, including an archiving module 1010, an I/O controller 1015, a database controller 1020, memory 1025, a processor 1030, and a database 1035. These components may be in electronic communication via one or more buses (e.g., bus 1040).

The archiving module 1010 may be an example of an archiving module 815 or 905 as described herein. For example, the archiving module 1010 may perform any of the methods or processes described above with reference to FIGS. 8 and 9. In some cases, the archiving module 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting offloading data to a cold storage database).

Figure 11:
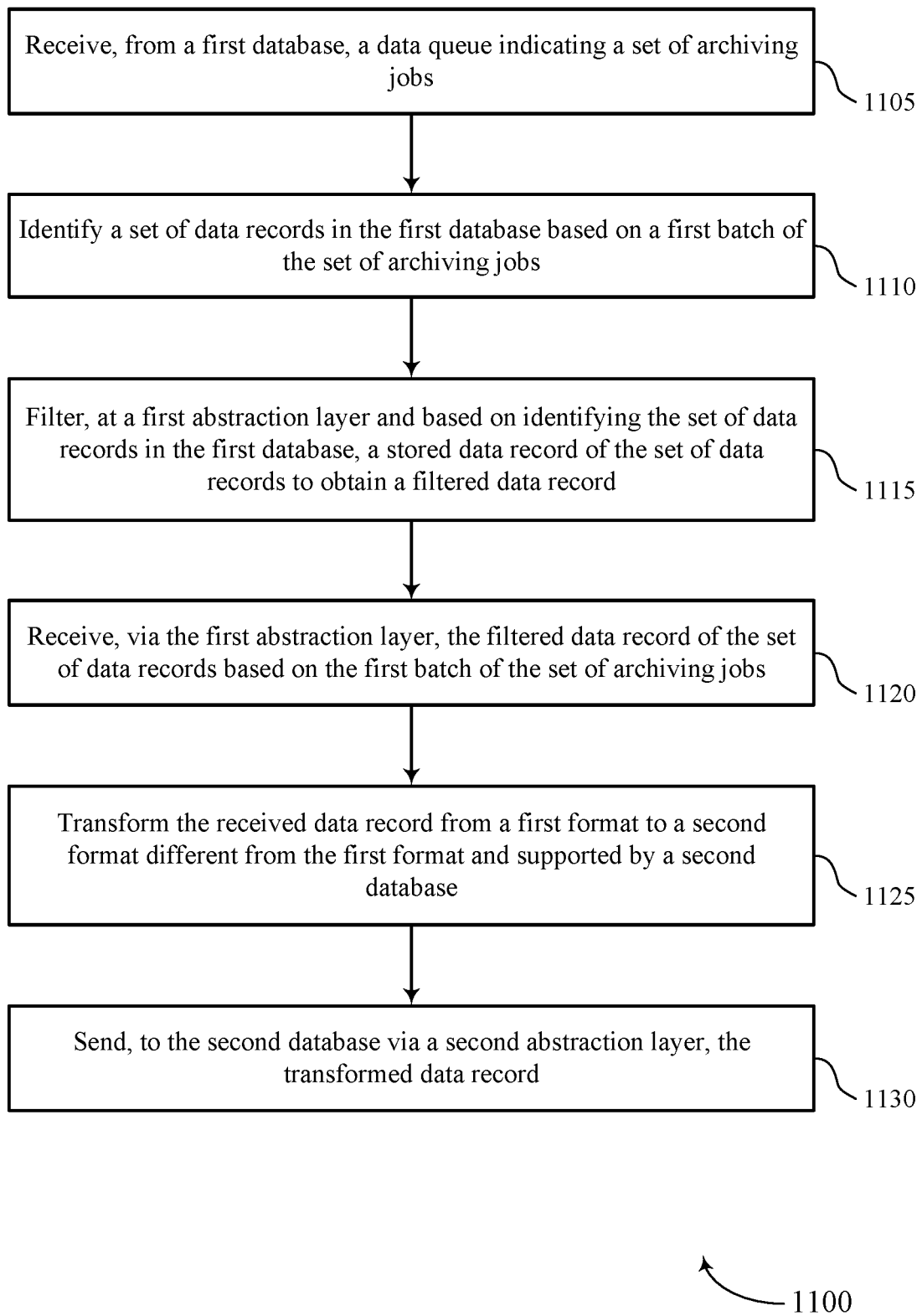
FIGS. 11 through 13 show flowcharts illustrating methods that support offloading data to a cold storage database in accordance with aspects of the present disclosure.

FIG. 11 shows a flowchart illustrating a method 1100 that supports offloading data to a cold storage database in accordance with aspects of the present disclosure. The operations of method 1100 may be implemented by an application server or its components as described herein. For example, the operations of method 1100 may be performed by an archiving module as described with reference to FIGS. 8 through 10. In some examples, an application server may execute a set of instructions to control the functional elements of the application server to perform the functions described below. Additionally or alternatively, an application server may perform aspects of the functions described below using special-purpose hardware.

At 1105, the application server may receive, from a first database, a data queue indicating a set of archiving jobs. The operations of 1105 may be performed according to the methods described herein. In some examples, aspects of the operations of 1105 may be performed by an archiving job component as described with reference to FIGS. 8 through 10.

At 1110, the application server may identify a set of data records in the first database based on a first batch of the set of archiving jobs, where the set of data records is stored in a first format supported by the first database and a stored data record of the set of data records includes a set of information. The operations of 1110 may be performed according to the methods described herein. In some examples, aspects of the operations of 1110 may be performed by a data records identification component as described with reference to FIGS. 8 through 10.

At 1115, the application server may filter, at a first abstraction layer and based on identifying the set of data records in the first database, the stored data record of the set of data records to obtain a filtered data record, where the filtered data record includes a subset of the set of information for the stored data record. The operations of 1115 may be performed according to the methods described herein. In some examples, aspects of the operations of 1115 may be performed by a filtering component as described with reference to FIGS. 8 through 10.

At 1120, the application server may receive, via the first abstraction layer, the filtered data record of the set of data records based on the first batch of the set of archiving jobs. The operations of 1120 may be performed according to the methods described herein. In some examples, aspects of the operations of 1120 may be performed by a filtered data record receiving component as described with reference to FIGS. 8 through 10.

At 1125, the application server may transform the received data record from the first format to a second format different from the first format and supported by a second database. The operations of 1125 may be performed according to the methods described herein. In some examples, aspects of the operations of 1125 may be performed by a transformation component as described with reference to FIGS. 8 through 10.

At 1130, the application server may send, to the second database via a second abstraction layer, the transformed data record. The operations of 1130 may be performed according to the methods described herein. In some examples, aspects of the operations of 1130 may be performed by a sending component as described with reference to FIGS. 8 through 10.

Figure 12:
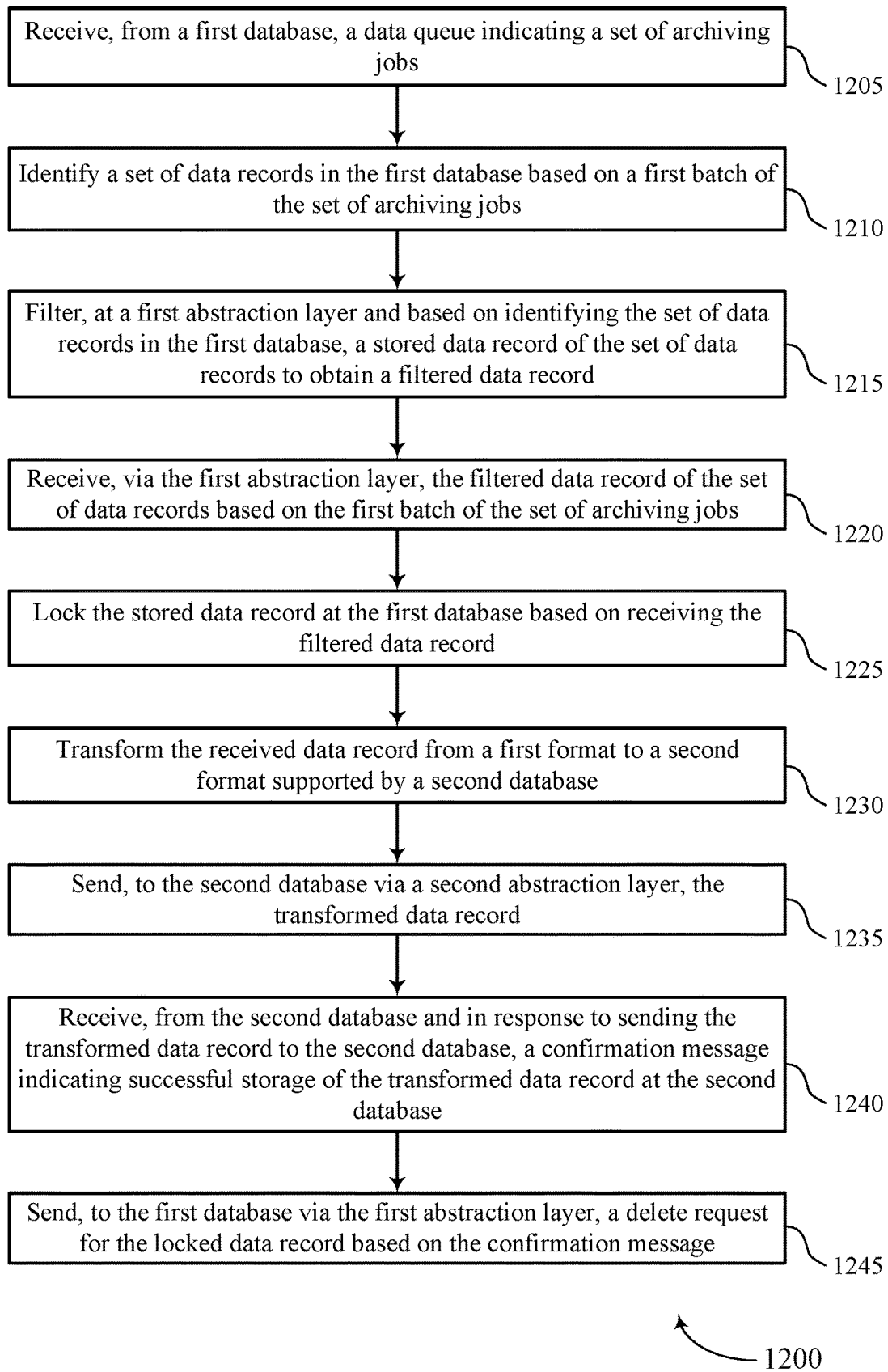

FIG. 12 shows a flowchart illustrating a method 1200 that supports offloading data to a cold storage database in accordance with aspects of the present disclosure. The operations of method 1200 may be implemented by an application server or its components as described herein. For example, the operations of method 1200 may be performed by an archiving module as described with reference to FIGS. 8 through 10. In some examples, an application server may execute a set of instructions to control the functional elements of the application server to perform the functions described below. Additionally or alternatively, an application server may perform aspects of the functions described below using special-purpose hardware.

At 1205, the application server may receive, from a first database, a data queue indicating a set of archiving jobs. The operations of 1205 may be performed according to the methods described herein. In some examples, aspects of the operations of 1205 may be performed by an archiving job component as described with reference to FIGS. 8 through 10.

At 1210, the application server may identify a set of data records in the first database based on a first batch of the set of archiving jobs. In some cases, the set of data records is stored in a first format supported by the first database and a stored data record of the set of data records includes a set of information. The operations of 1210 may be performed according to the methods described herein. In some examples, aspects of the operations of 1210 may be performed by a data records identification component as described with reference to FIGS. 8 through 10.

At 1215, the application server may filter, at a first abstraction layer and based on identifying the set of data records in the first database, the stored data record of the set of data records to obtain a filtered data record. In some cases, the filtered data record includes a subset of the set of information for the stored data record. The operations of 1215 may be performed according to the methods described herein. In some examples, aspects of the operations of 1215 may be performed by a filtering component as described with reference to FIGS. 8 through 10.

At 1220, the application server may receive, via the first abstraction layer, the filtered data record of the set of data records based on the first batch of the set of archiving jobs. The operations of 1220 may be performed according to the methods described herein. In some examples, aspects of the operations of 1220 may be performed by a filtered data record receiving component as described with reference to FIGS. 8 through 10.

At 1225, the application server may lock the stored data record at the first database based on receiving the filtered data record. In some cases, the first database may refrain from modifying the locked data record. The operations of 1225 may be performed according to the methods described herein. In some examples, aspects of the operations of 1225 may be performed by a lock component as described with reference to FIGS. 8 through 10.

At 1230, the application server may transform the received data record from the first format to a second format different from the first format and supported by a second database. The operations of 1230 may be performed according to the methods described herein. In some examples, aspects of the operations of 1230 may be performed by a transformation component as described with reference to FIGS. 8 through 10.

At 1235, the application server may send, to the second database via a second abstraction layer, the transformed data record. The operations of 1235 may be performed according to the methods described herein. In some examples, aspects of the operations of 1235 may be performed by a sending component as described with reference to FIGS. 8 through 10.

At 1240, the application server may receive, from the second database and in response to sending the transformed data record to the second database, a confirmation message indicating successful storage of the transformed data record at the second database. The operations of 1240 may be performed according to the methods described herein. In some examples, aspects of the operations of 1240 may be performed by a message component as described with reference to FIGS. 8 through 10.

At 1245, the application server may send, to the first database via the first abstraction layer, a delete request for the locked data record based on the confirmation message. The operations of 1245 may be performed according to the methods described herein. In some examples, aspects of the operations of 1245 may be performed by a delete request component as described with reference to FIGS. 8 through 10.

Figure 13:
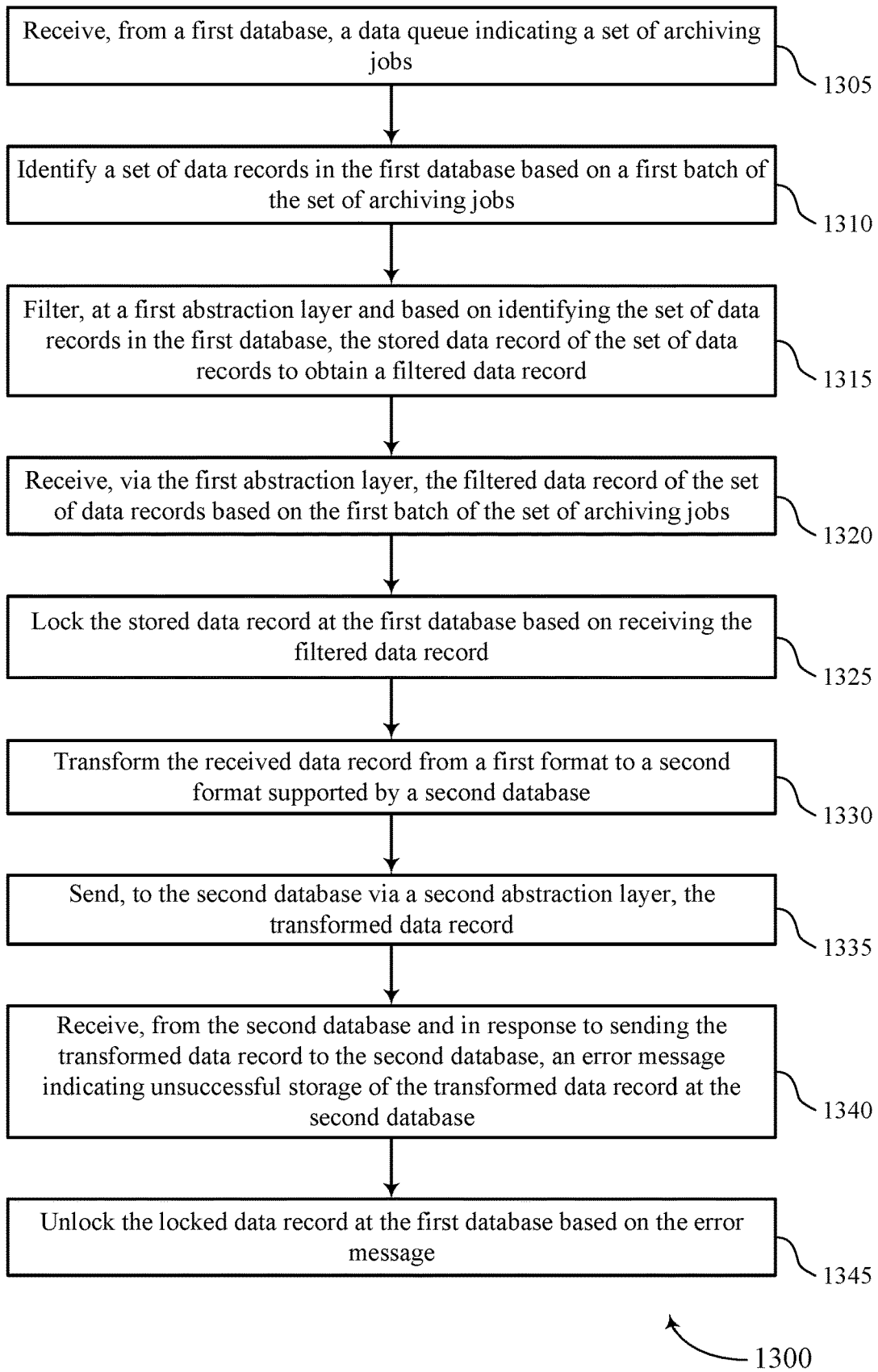

FIG. 13 shows a flowchart illustrating a method 1300 that supports offloading data to a cold storage database in accordance with aspects of the present disclosure. The operations of method 1300 may be implemented by an application server or its components as described herein. For example, the operations of method 1300 may be performed by an archiving module as described with reference to FIGS. 8 through 10. In some examples, an application server may execute a set of instructions to control the functional elements of the application server to perform the functions described below. Additionally or alternatively, an application server may perform aspects of the functions described below using special-purpose hardware.

At 1305, the application server may receive, from a first database, a data queue indicating a set of archiving jobs. The operations of 1305 may be performed according to the methods described herein. In some examples, aspects of the operations of 1305 may be performed by an archiving job component as described with reference to FIGS. 8 through 10.

At 1310, the application server may identify a set of data records in the first database based on a first batch of the set of archiving jobs. In some cases, the set of data records may be stored in a first format supported by the first database and a stored data record of the set of data records includes a set of information. The operations of 1310 may be performed according to the methods described herein. In some examples, aspects of the operations of 1310 may be performed by a data records identification component as described with reference to FIGS. 8 through 10.

At 1315, the application server may filter, at a first abstraction layer and based on identifying the set of data records in the first database, the stored data record of the set of data records to obtain a filtered data record. In some examples, the filtered data record may include a subset of the set of information for the stored data record. The operations of 1315 may be performed according to the methods described herein. In some examples, aspects of the operations of 1315 may be performed by a filtering component as described with reference to FIGS. 8 through 10.

At 1320, the application server may receive, via the first abstraction layer, the filtered data record of the set of data records based on the first batch of the set of archiving jobs. The operations of 1320 may be performed according to the methods described herein. In some examples, aspects of the operations of 1320 may be performed by a filtered data record receiving component as described with reference to FIGS. 8 through 10.

At 1325, the application server may lock the stored data record at the first database based on receiving the filtered data record. In some cases, the first database may refrain from modifying the locked data record. The operations of 1325 may be performed according to the methods described herein. In some examples, aspects of the operations of 1325 may be performed by a lock component as described with reference to FIGS. 8 through 10.

At 1330, the application server may transform the received data record from the first format to a second format different from the first format and supported by a second database. The operations of 1330 may be performed according to the methods described herein. In some examples, aspects of the operations of 1330 may be performed by a transformation component as described with reference to FIGS. 8 through 10.

At 1335, the application server may send, to the second database via a second abstraction layer, the transformed data record. The operations of 1335 may be performed according to the methods described herein. In some examples, aspects of the operations of 1335 may be performed by a sending component as described with reference to FIGS. 8 through 10.

At 1340, the application server may receive, from the second database and in response to sending the transformed data record to the second database, an error message indicating unsuccessful storage of the transformed data record at the second database. The operations of 1340 may be performed according to the methods described herein. In some examples, aspects of the operations of 1340 may be performed by a message component as described with reference to FIGS. 8 through 10.

At 1345, the application server may unlock the locked data record at the first database based on the error message. The operations of 1345 may be performed according to the methods described herein. In some examples, aspects of the operations of 1345 may be performed by a lock component as described with reference to FIGS. 8 through 10.

A method for data archiving from a first database to a second database is described. The method may include receiving, from the first database, a data queue indicating a set of archiving jobs, identifying a set of data records in the first database based on a first batch of the set of archiving jobs, where the set of data records is stored in a first format supported by the first database and a stored data record of the set of data records includes a set of information, filtering, at a first abstraction layer and based on identifying the set of data records in the first database, the stored data record of the set of data records to obtain a filtered data record, where the filtered data record includes a subset of the set of information for the stored data record, receiving, via the first abstraction layer, the filtered data record of the set of data records based on the first batch of the set of archiving jobs, transforming the received data record from the first format to a second format different from the first format and supported by the second database, and sending, to the second database via a second abstraction layer, the transformed data record.

An apparatus for data archiving from a first database to a second database is described. The apparatus may include a processor, memory coupled with the processor, and instructions stored in the memory. The instructions may be executable by the processor to cause the apparatus to receive, from the first database, a data queue indicating a set of archiving jobs, identify a set of data records in the first database based on a first batch of the set of archiving jobs, where the set of data records is stored in a first format supported by the first database and a stored data record of the set of data records includes a set of information, filter, at a first abstraction layer and based on identifying the set of data records in the first database, the stored data record of the set of data records to obtain a filtered data record, where the filtered data record includes a subset of the set of information for the stored data record, receive, via the first abstraction layer, the filtered data record of the set of data records based on the first batch of the set of archiving jobs, transform the received data record from the first format to a second format different from the first format and supported by the second database, and send, to the second database via a second abstraction layer, the transformed data record.

Another apparatus for data archiving from a first database to a second database is described. The apparatus may include means for receiving, from the first database, a data queue indicating a set of archiving jobs, identifying a set of data records in the first database based on a first batch of the set of archiving jobs, where the set of data records is stored in a first format supported by the first database and a stored data record of the set of data records includes a set of information, filtering, at a first abstraction layer and based on identifying the set of data records in the first database, the stored data record of the set of data records to obtain a filtered data record, where the filtered data record includes a subset of the set of information for the stored data record, receiving, via the first abstraction layer, the filtered data record of the set of data records based on the first batch of the set of archiving jobs, transforming the received data record from the first format to a second format different from the first format and supported by the second database, and sending, to the second database via a second abstraction layer, the transformed data record.

A non-transitory computer-readable medium storing code for data archiving from a first database to a second database is described. The code may include instructions executable by a processor to receive, from the first database, a data queue indicating a set of archiving jobs, identify a set of data records in the first database based on a first batch of the set of archiving jobs, where the set of data records is stored in a first format supported by the first database and a stored data record of the set of data records includes a set of information, filter, at a first abstraction layer and based on identifying the set of data records in the first database, the stored data record of the set of data records to obtain a filtered data record, where the filtered data record includes a subset of the set of information for the stored data record, receive, via the first abstraction layer, the filtered data record of the set of data records based on the first batch of the set of archiving jobs, transform the received data record from the first format to a second format different from the first format and supported by the second database, and send, to the second database via a second abstraction layer, the transformed data record.

Some examples of the method, apparatuses, and non-transitory computer-readable medium described herein may further include operations, features, means, or instructions for filtering, at the first abstraction layer and based on identifying the set of data records in the first database, the set of data records to obtain a filtered set of data records, receiving, via the first abstraction layer, the filtered set of data records based on the first batch of the set of archiving jobs, transforming the received set of data records from the first format to the second format, sending, to the second database via the second abstraction layer, the transformed set of data records, and receiving, from the second database and in response to sending the transformed set of data records to the second database, a confirmation message indicating successful storage of the transformed set of data records at the second database.

Some examples of the method, apparatuses, and non-transitory computer-readable medium described herein may further include operations, features, means, or instructions for incrementing a watermark in the first database based on the confirmation message.

In some examples of the method, apparatuses, and non-transitory computer-readable medium described herein, the watermark may include a creation date and incrementing the watermark may include operations, features, means, or instructions for setting the creation date for the watermark to a latest creation date of a data record in the set of data records. In some examples of the method, apparatuses, and non-transitory computer-readable medium described herein, the watermark corresponds to a particular tenant in the first database, a particular type of data record in the first database, or a combination thereof.

In some examples of the method, apparatuses, and non-transitory computer-readable medium described herein, receiving the filtered set of data records further may include operations, features, means, or instructions for receiving the filtered set of data records according to a set of batches, where each batch of the set of batches includes a parent data record and any child data records for the parent data record.

In some examples of the method, apparatuses, and non-transitory computer-readable medium described herein, sending the transformed set of data records to the second database further may include operations, features, means, or instructions for sending the transformed set of data records to the second database according to a set of batches, where each batch of the set of batches includes a number of data records that is less than a threshold number of data records supported by a writing process of the second abstraction layer.

In some examples of the method, apparatuses, and non-transitory computer-readable medium described herein, the data archiving may be performed at an application server. Some examples of the method, apparatuses, and non-transitory computer-readable medium described herein may further include operations, features, means, or instructions for triggering dequeuing of the first batch of the set of archiving jobs based on an amount of available processing resources at the application server being greater than a first threshold amount of processing resources, where the set of data records may be identified based on the triggered dequeuing.

Some examples of the method, apparatuses, and non-transitory computer-readable medium described herein may further include operations, features, means, or instructions for halting the data archiving based on the amount of available processing resources at the application server being less than a second threshold amount of processing resources.

Some examples of the method, apparatuses, and non-transitory computer-readable medium described herein may further include operations, features, means, or instructions for sending the first batch of the set of archiving jobs to a functional job processor based on the triggered dequeuing and updating, at the functional job processor, a state of each archiving job of the first batch of the set of archiving jobs based on the data archiving. In some examples of the method, apparatuses, and non-transitory computer-readable medium described herein, the state of each archiving job includes new, running, paused, retrying, error, or complete.

Some examples of the method, apparatuses, and non-transitory computer-readable medium described herein may further include operations, features, means, or instructions for locking the stored data record at the first database based on receiving the filtered data record, where the first database may refrain from modifying the locked data record.

Some examples of the method, apparatuses, and non-transitory computer-readable medium described herein may further include operations, features, means, or instructions for receiving, from the second database and in response to sending the transformed data record to the second database, a confirmation message indicating successful storage of the transformed data record at the second database, and sending, to the first database via the first abstraction layer, a delete request for the locked data record based on the confirmation message.

Some examples of the method, apparatuses, and non-transitory computer-readable medium described herein may further include operations, features, means, or instructions for receiving, from the second database and in response to sending the transformed data record to the second database, an error message indicating unsuccessful storage of the transformed data record at the second database, and unlocking the locked data record at the first database based on the error message.

In some examples of the method, apparatuses, and non-transitory computer-readable medium described herein, the set of information for the stored data record may include a first set of fields visible to a tenant and a second set of fields hidden from the tenant, where filtering the stored data record may include operations, features, means, or instructions for retrieving, from the first database and at the first abstraction layer, the first set of fields visible to the tenant for the filtered data record.

Some examples of the method, apparatuses, and non-transitory computer-readable medium described herein may further include operations, features, means, or instructions for receiving, from a user device, a database query for a data record, determining whether the data record may be stored in the first database or the second database based on the data record and the data archiving, and sending the database query to the first database or the second database based on the determining. In some examples of the method, apparatuses, and non-transitory computer-readable medium described herein, the first database may be a relational database and the second database may be a non-relational database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data archiving from a first database to a second database, comprising:
   receiving, from the first database, a data queue indicating a set of archiving jobs;
   identifying a set of data records in the first database based at least in part on a first batch of the set of archiving jobs, wherein the set of data records is stored in a first format supported by the first database and a stored data record of the set of data records comprises a set of information;
   filtering, at a first abstraction layer and based at least in part on identifying the set of data records in the first database, the stored data record of the set of data records to obtain a filtered data record, wherein the filtered data record comprises a first subset of the set of information for the stored data record that is visible to a user of a tenant accessing the stored data record;
   receiving, via the first abstraction layer, the filtered data record of the set of data records based at least in part on the first batch of the set of archiving jobs, the receiving comprising receiving the first subset of the set of information that is visible to the user of the tenant accessing the stored data record and refraining from receiving a second subset of the set of information for the stored data record that is hidden from the user of the tenant accessing the stored data record;
   locking access to the stored data record at the first database in response to receiving the filtered data record, wherein the first database refrains from modifying the locked data record;
   transforming the received data record from the first format to a second format different from the first format and supported by the second database;
   sending, to the second database via a second abstraction layer, the transformed data record;
   receiving, from the second database and in response to sending the transformed data record to the second database, a confirmation message indicating successful storage of the transformed data record at the second database; and
   sending, to the first database via the first abstraction layer, a delete request for the locked data record based at least in part on the confirmation message.

2. The method of claim 1, further comprising:
   filtering, at the first abstraction layer and based at least in part on identifying the set of data records in the first database, the set of data records to obtain a filtered set of data records;
   receiving, via the first abstraction layer, the filtered set of data records based at least in part on the first batch of the set of archiving jobs;
   transforming the received set of data records from the first format to the second format;
   sending, to the second database via the second abstraction layer, the transformed set of data records; and
   receiving, from the second database and in response to sending the transformed set of data records to the second database, a confirmation message indicating successful storage of the transformed set of data records at the second database.

3. The method of claim 2, further comprising:
   incrementing a watermark in the first database based at least in part on the confirmation message.

4. The method of claim 3, wherein the watermark comprises a creation date and incrementing the watermark comprises:
   setting the creation date for the watermark to a latest creation date of a data record in the set of data records.

5. The method of claim 3, wherein the watermark corresponds to a particular tenant in the first database, a particular type of data record in the first database, or a combination thereof.

6. The method of claim 2, wherein receiving the filtered set of data records further comprises:
   receiving the filtered set of data records according to a plurality of batches, wherein each batch of the plurality of batches comprises a parent data record and any child data records for the parent data record.

7. The method of claim 2, wherein sending the transformed set of data records to the second database further comprises:

sending the transformed set of data records to the second database according to a plurality of batches, wherein each batch of the plurality of batches comprises a number of data records that is less than a threshold number of data records supported by a writing process of the second abstraction layer.

8. The method of claim 1, wherein the data archiving is performed at an application server, the method further comprising:
triggering dequeuing of the first batch of the set of archiving jobs based at least in part on an amount of available processing resources at the application server being greater than a first threshold amount of processing resources, wherein the set of data records is identified based at least in part on the triggered dequeuing.

9. The method of claim 8, further comprising:
halting the data archiving based at least in part on the amount of available processing resources at the application server being less than a second threshold amount of processing resources.

10. The method of claim 8, further comprising:
sending the first batch of the set of archiving jobs to a functional job processor based at least in part on the triggered dequeuing; and
updating, at the functional job processor, a state of each archiving job of the first batch of the set of archiving jobs based at least in part on the data archiving.

11. The method of claim 10, wherein the state of each archiving job comprises new, running, paused, retrying, error, or complete.

12. The method of claim 1, further comprising:
receiving, from the second database and in response to sending the transformed data record to the second database, an error message indicating unsuccessful storage of the transformed data record at the second database; and
unlocking access to the locked data record at the first database in response to the error message.

13. The method of claim 1, further comprising:
receiving, from a user device, a database query for a data record;
determining whether the data record is stored in the first database or the second database based at least in part on the data record and the data archiving; and
sending the database query to the first database or the second database based at least in part on the determining.

14. The method of claim 1, wherein:
the first database comprises a relational database; and
the second database comprises a non-relational database.

15. An apparatus for data archiving from a first database to a second database, comprising:
a processor;
memory coupled with the processor; and
instructions stored in the memory and executable by the processor to cause the apparatus to:
receive, from the first database, a data queue indicating a set of archiving jobs;
identify a set of data records in the first database based at least in part on a first batch of the set of archiving jobs, wherein the set of data records is stored in a first format supported by the first database and a stored data record of the set of data records comprises a set of information;
filter, at a first abstraction layer and based at least in part on identifying the set of data records in the first database, the stored data record of the set of data records to obtain a filtered data record, wherein the filtered data record comprises a first subset of the set of information for the stored data record that is visible to a user of a tenant accessing the stored data record;
receive, via the first abstraction layer, the filtered data record of the set of data records based at least in part on the first batch of the set of archiving jobs, the receiving comprising receiving the first subset of the set of information that is visible to the user of the tenant accessing the stored data record and refraining from receiving a second subset of the set of information for the stored data record that is hidden from the user of the tenant accessing the stored data record;
lock access to the stored data record at the first database in response to receiving the filtered data record, wherein the first database refrains from modifying the locked data record;
transform the received data record from the first format to a second format different from the first format and supported by the second database;
send, to the second database via a second abstraction layer, the transformed data record;
receive, from the second database and in response to sending the transformed data record to the second database, a confirmation message indicating successful storage of the transformed data record at the second database; and
send, to the first database via the first abstraction layer, a delete request for the locked data record based at least in part on the confirmation message.

16. The apparatus of claim 15, wherein the instructions are further executable by the processor to cause the apparatus to:
filter, at the first abstraction layer and based at least in part on identifying the set of data records in the first database, the set of data records to obtain a filtered set of data records;
receive, via the first abstraction layer, the filtered set of data records based at least in part on the first batch of the set of archiving jobs;
transform the received set of data records from the first format to the second format;
send, to the second database via the second abstraction layer, the transformed set of data records; and
receive, from the second database and in response to sending the transformed set of data records to the second database, a confirmation message indicating successful storage of the transformed set of data records at the second database.

17. A non-transitory computer-readable medium storing code for data archiving from a first database to a second database, the code comprising instructions executable by a processor to:
receive, from the first database, a data queue indicating a set of archiving jobs;
identify a set of data records in the first database based at least in part on a first batch of the set of archiving jobs, wherein the set of data records is stored in a first format supported by the first database and a stored data record of the set of data records comprises a set of information;
filter, at a first abstraction layer and based at least in part on identifying the set of data records in the first database, the stored data record of the set of data records to obtain a filtered data record, wherein the filtered data record comprises a first subset of the set of information for the stored data record that is visible to a user of a tenant accessing the stored data record;

receive, via the first abstraction layer, the filtered data record of the set of data records based at least in part on the first batch of the set of archiving jobs, the receiving comprising receiving the first subset of the set of information that is visible to the user of the tenant accessing the stored data record and refraining from receiving a second subset of the set of information for the stored data record that is hidden from the user of the tenant accessing the stored data record;

lock access to the stored data record at the first database in response to receiving the filtered data record, wherein the first database refrains from modifying the locked data record;

transform the received data record from the first format to a second format different from the first format and supported by the second database;

send, to the second database via a second abstraction layer, the transformed data record;

receive, from the second database and in response to sending the transformed data record to the second database, a confirmation message indicating successful storage of the transformed data record at the second database; and send, to the first database via the first abstraction layer, a delete request for the locked data record based at least in part on the confirmation message.

* * * * *